United States Patent [19]
Dreyer

[11] Patent Number: 6,055,108
[45] Date of Patent: Apr. 25, 2000

[54] IMAGING ARTICLES AND METHODS USING DUAL-AXIS RETROREFLECTIVE ELEMENTS

[75] Inventor: John F. Dreyer, North Oaks, Minn.

[73] Assignee: Minnesota Mining and Manufacturing Company, St. Paul, Minn.

[21] Appl. No.: 09/248,449

[22] Filed: Feb. 11, 1999

[51] Int. Cl.[7] ............................ G02B 27/10; G02B 5/122; G02B 5/124; G08B 11/00
[52] U.S. Cl. ......................... 359/627; 359/529; 359/530; 359/531; 359/619; 359/621; 359/625; 404/16
[58] Field of Search ........................... 359/515–520, 359/522–525, 527–530, 546–547, 551–553, 900, 619–628; 404/14–16

[56] References Cited

U.S. PATENT DOCUMENTS

| | | | |
|---|---|---|---|
| 3,712,706 | 1/1973 | Stamm | 350/103 |
| 3,926,402 | 12/1975 | Heenan | 249/117 |
| 4,025,159 | 5/1977 | McGrath | 350/105 |
| 4,349,598 | 9/1982 | White | 428/161 |
| 4,576,850 | 3/1986 | Martens | 428/156 |
| 4,582,885 | 4/1986 | Barber | 528/28 |
| 4,588,258 | 5/1986 | Hoopman | 350/103 |
| 4,668,558 | 5/1987 | Barber | 428/156 |
| 4,895,428 | 1/1990 | Nelson et al. | 350/103 |
| 4,938,563 | 7/1990 | Nelson et al. | 350/103 |
| 4,983,436 | 1/1991 | Bailey et al. | 428/40 |
| 5,066,098 | 11/1991 | Kult et al. | 359/540 |
| 5,272,562 | 12/1993 | Coderre | 359/529 |
| 5,450,235 | 9/1995 | Smith et al. | 359/529 |
| 5,889,615 | 3/1999 | Dreyer et al. | 359/529 |

FOREIGN PATENT DOCUMENTS

| 423464 | 2/1935 | United Kingdom . |
|---|---|---|
| 441319 | 1/1936 | United Kingdom . |

*Primary Examiner*—Georgia Epps
*Assistant Examiner*—David N. Spector
*Attorney, Agent, or Firm*—Stephen W. Buckingham; Kevin Raasch

[57] ABSTRACT

Imaging articles and methods are disclosed that use dual-axis retroreflective elements such as 90 degree prisms and linear lenticular elements in which the imaging is either superimposed on the imaged object or displaced therefrom. If the imaging is superimposed on the imaged object, it is accomplished by retroreflection. If the imaging is displaced from the imaged object, it may be accomplished by dual axis retroreflection or retrotransmission.

25 Claims, 14 Drawing Sheets

IMAGING ARTICLES AND METHODS USING DUAL-AXIS RETROREFLECTIVE ELEMENTS

The present invention relates to the field of optical imaging using dual-axis retroreflective elements, including both articles and methods of imaging using the articles.

BACKGROUND

Optical imaging is useful in a variety of contexts to produce a desired optical effect. The imaging may produce an image that is the same size as the object or it may involve magnification or reduction in the size of the image relative to the object being imaged. In addition, the image may be reversed or rotated about a vertical axis relative to the object and/or the image may be flipped or rotated about a horizontal axis relative to the object. Furthermore, the image may be reproduced sharply or it may appear slightly diffused relative to the object.

In another aspect, optical imaging may involve the production of an image in a different location from the object being imaged. One example of that type of imaging is in the use of an overhead projector to provide an image on a screen or wall based on an object located on a platform of the overhead projector. This type of imaging is typically accomplished with the use of lenses and other optical components.

In still another aspect, optical imaging occurs in retroreflection where an image of an object is produced at the same location as the object. Retroreflection occurs when incident light rays are reflected from an article along a path that forms a 180 degree angle with the path followed by the light when approaching the article. Depending on the nature of the article, the reflected path of the light may be shifted or offset slightly from the incident path of the light. Because the light is returned along substantially the same path it traveled towards the imaging article, the image can be viewed along that same path. Retroreflection is typically accomplished using retroreflective components such as cube corners (e.g., U.S. Pat. No. 5,272,562 to Coderre and U.S. Pat. No. 5,450,235 to Smith et al.), beaded retroreflectors (e.g., U.S. Pat. No. 4,025,159 to McGrath; U.S. Pat. No. 4,983,436 to Bailey et al.; and U.S. Pat. No. 5,066,098 to Kult et al.), etc.

In both of the above aspects of imaging, the need for optical components such as lenses, cube corner articles, beaded retroreflectors, etc. increases the cost and/or complexity of the imaging articles.

SUMMARY OF THE INVENTION

The present invention provides optical imaging articles including dual-axis retroreflective elements to image objects. The invention also provides methods of imaging using the articles that include dual-axis retroreflective elements. The imaging may be accomplished in reflection or transmission.

Regardless of the type of imaging, one advantage common to all of the articles and methods of the invention is the relatively simple structures required when manufacturing the optical imaging articles. Unlike the complicated machining and other manufacturing/replication techniques employed with cube corner structures or the technology associated with the manufacture and bonding of retroreflective beads and/or lenses, the structures of the present invention rely on articles including relatively simple dual-axis retroreflective elements and planar surfaces to provide optical imaging. One advantage of the articles is that they provide imaging free of color problems.

When retroreflective imaging is provided by the articles and/or methods of the present invention, a number of advantages may be obtained including the ability to provide either steady or modulating retroreflection in response to a steady source of incident light, the ability to independently control dispersion of the retroreflected light in two different planes, and the ability to improve the effective aperture of the articles (which impacts brightness). Another advantage of the retroreflective imaging articles and methods of the present invention is the ability to expand the incident angle limitations experienced by other retroreflective systems, e.g., cube corners and beads.

Some of the optical imaging articles and methods rely on 90 degree prisms as the dual-axis retroreflective elements and may alternatively provide imaging through retrotransmission. As used in connection with the present invention, "retrotransmission" is the optical phenomenon in which light enters one side of an optical imaging article at an entrance angle relative to a normal axis and exits the opposite side of the article at an exit angle (relative to that same normal axis) that is equal in magnitude but opposite in sign to the entrance angle of the light. By so doing, a retrotransmissive optical imaging article provides an image on the opposite side of the article from the imaged object, with the image appearing displaced in front of the retrotransmissive article by the same distance as the imaged object is located behind the article. Retrotransmission may be either limited or unlimited as discussed in greater detail below.

Among the advantages of retrotransmission are the ability to provide an image that is displaced from the object and the dual-axis retroreflective elements, the ability to provide an optical alignment system when using limited retrotransmission, the ability to image free of color problems, and the ability to induce negative keystoning to zero out unwanted keystoning from other sources, e.g., with overhead projectors.

In one aspect, the present invention provides an optical imaging article including a first side having a plurality of first dual-axis retroreflective elements located in a first plane, each of the first dual-axis retroreflective elements being generally aligned with a first axis, the first side further including a plurality of planar transmissive first surfaces oriented parallel to the first plane; and a second side including a plurality of second dual-axis retroreflective elements located in a second plane and aligned with a second axis, the second side further including a plurality of reflective planar second surfaces oriented parallel to the second plane, the second dual-axis retroreflective elements being spaced from the first side, wherein the first and second axes are generally perpendicular to each other.

In another aspect, the present invention provides a pavement marker including a first side comprising a plurality of first dual-axis retroreflective elements located in a first plane, each of the first dual-axis retroreflective elements being generally aligned with a first axis, the first side further including a plurality of planar reflective first surfaces oriented parallel to the first plane; a second side located opposite the first side, the second side including a plurality of second dual-axis retroreflective elements located in a second plane and aligned with a second axis, wherein the second plane is parallel to the first plane and the first and second axes are generally perpendicular to each other; and a first optical window located between the first and second sides, the optical window transmitting at least a portion of light incident thereon and refracting the light towards one of the first and second sides.

In another aspect, the present invention provides an optical imaging article including a first side having a plurality of dual-axis retroreflective elements located in a first plane, each of the dual-axis retroreflective elements being generally aligned with a first axis, the first side further including at least one planar reflective first surface oriented parallel to the first plane; and an opposing prism including a linear peak and a pair of surfaces oriented perpendicular to each other, the linear peak of the prism being spaced from the first side and generally aligned with a second axis, wherein the first and second axes are generally perpendicular to each other.

In another aspect, the present invention provides an optical imaging article including a first side having a plurality of first dual-axis retroreflective elements located in a first plane, each of the first dual-axis retroreflective elements being generally aligned with a first axis, the first side further including a plurality of planar transmissive first surfaces oriented parallel to the first plane; and a second side reflecting a portion of light incident thereon and transmitting a portion of light incident thereon.

In another aspect, the present invention provides an optical imaging article including a first side having a plurality of first dual-axis retroreflective elements located in a first plane, each of the first dual-axis retroreflective elements being generally aligned with a first axis, the first side further including a plurality of planar first surfaces oriented parallel to the first plane; and a second side having a plurality of second dual-axis retroreflective elements located in a second plane and aligned with a second axis, the second side further including a plurality of planar second surfaces oriented parallel to the second plane, the second dual-axis retroreflective elements being spaced from the first side, wherein the first and second axes are generally perpendicular to each other.

In another aspect, the present invention provides an imaging device including a first optical surface having a plurality of first dual-axis retroreflective elements located in a first plane, the plurality of first dual-axis retroreflective elements being generally aligned with a first axis and generally perpendicular to a second axis; and a second optical surface having a plurality of second dual-axis retroreflective elements located in a second plane, the plurality of second dual-axis retroreflective elements being generally aligned with a third axis and generally perpendicular to a fourth axis; wherein the second axis lies in a plane that is generally parallel to third axis, and further wherein the fourth axis lies in a plane that is generally parallel to the first axis, and still further wherein the first plane intersects the second plane; whereby a portion of light from an object that is directed in a first direction towards the first optical surface is reflected by the first dual-axis retroreflective elements towards the second optical surface where it is reflected by the second dual-axis retroreflective elements in a second direction to form an image of the object.

In another aspect, the present invention provides a method of retroreflective superimposed imaging by providing an optical imaging article including a first side having a plurality of first dual-axis retroreflective elements located in a first plane, each of the first dual-axis retroreflective elements being generally aligned with a first axis, the first side further including a plurality of planar transmissive first surfaces oriented parallel to the first plane; and a second side having a plurality of second dual-axis retroreflective elements located in a second plane and aligned with a second axis, the second side further including a plurality of reflective planar second surfaces oriented parallel to the second plane, the second dual-axis retroreflective elements being spaced from the first side, wherein the first and second axes are generally perpendicular to each other. The method further includes directing light at the optical imaging article from an object; and observing a retroreflected image of the object.

In another aspect, the present invention provides a method of retroreflective superimposed imaging by providing an optical imaging article including a first side having a plurality of dual-axis retroreflective elements located in a first plane, each of the dual-axis retroreflective elements being generally aligned with a first axis, the first side further including at least one planar reflective first surface oriented parallel to the first plane; and an opposing prism including a linear peak and a pair of surfaces oriented perpendicular to each other, the linear peak of the prism being spaced from the first side and generally aligned with a second axis, wherein the first and second axes are generally perpendicular to each other. The method further includes directing light at the optical imaging article from an object; and observing a retroreflected image of the object.

As used in connection with the present invention, the term "90 degree prisms" refers to prismatic elements including two planar facets oriented perpendicular to each other. The facets reflect substantial portions of incident light by total internal reflection and/or using reflective materials.

These and other features and advantages of the optical imaging articles and methods of using them are described below.

BRIEF DESCRIPTION OF THE DRAWINGS

FIG. 2AA is a cross-sectional view of an alternative structured surface useful in connection with the system.

DETAILED DESCRIPTION OF ILLUSTRATIVE EMBODIMENTS OF THE INVENTION

Figure 1:
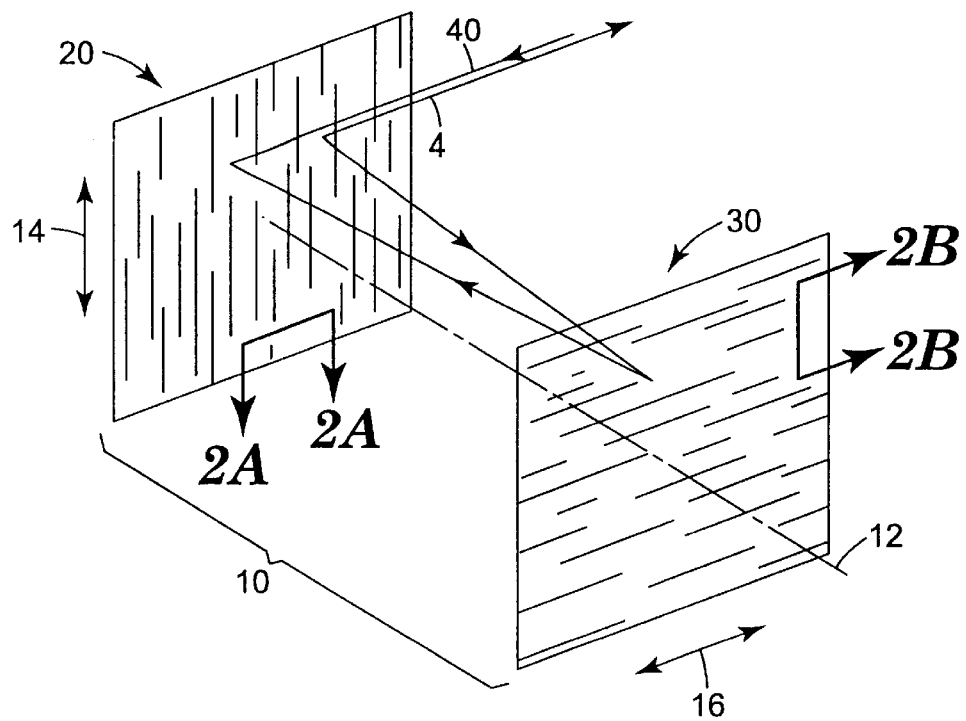
FIG. 1 is a perspective view of one retroreflective imaging system including 90 degree prisms as the dual-axis retroreflective elements.

The present invention provides imaging articles and methods using dual-axis retroreflective elements such as 90 degree prisms and linear lenticular elements in which the imaging is either superimposed on the imaged object or displaced therefrom. If the imaging is superimposed on the imaged object, it is accomplished by retroreflection. If the imaging is displaced from the imaged object, it can be accomplished by retrotransmission. The structures of the optical imaging articles and methods required for both superimposed and displaced imaging using dual-axis retroreflective elements are described below.

Retroreflection can be separated into two categories, i.e., spatial or three axis retroreflection and dual axis or two axis retroreflection. The most common usage of the term "retroreflection" assumes three axis retroreflection. Three axis retroreflection can be provided by a number of different optical structures. Two common three axis retroreflective structures are commonly referred to a cube corner elements and beaded retroreflectors. The characteristics of such retroreflectors have been widely studied and reported and will not be discussed in detail here. Briefly, however, three axis retroreflectors will retroreflect at least a portion of incident light within a "cone" of retroreflectivity located about the optical axis of the retroreflectors. The dimensions and shape of the cone of retroreflectivity can vary and the optical axis can be skewed in one direction or another by manipulation of the retroreflective structures and these variations will be known to those skilled in the art. At a minimum, however, three axis retroreflectors will retroreflect at least a portion of incident light from a source that can move in any combination of three directions relative to the optical axis of the retroreflectors.

Dual axis or two axis retroreflection is another useful phenomenon that is exploited in the present invention to provide imaging as discussed below. Dual axis retroreflection is accomplished by 90 degree prisms or linear lenticular elements and reflectors as discussed below, although it will be understood that any structure that provides the desired dual axis retroreflectivity could be substituted for the disclosed structures and objects.

Dual-axis retroreflection is described in detail in commonly assigned, copending U.S. patent application Ser. No. 08/883,870 filed on Jun. 27, 1997 and titled DUAL AXIS RETROREFLECTIVE ARTICLES (now U.S. Pat. No. 5,889,615). Briefly, however, dual-axis retroreflectors define a plane of retroreflection that is perpendicular to a length of the particular dual-axis retroreflective element, e.g., the facets in a 90 degree prism or the length of a linear lenticular element and its corresponding reflector. As a result, in a 90 degree prism, the plane of retroreflection is also perpendicular to a line of intersection formed by the pair of facets forming the prism (with the understanding that the line of intersection may be imaginary if the facets do not physically intersect). As a result, the prism will retroreflect a significant amount of light that strikes its facets along that plane of retroreflection and the retroreflected light will also travel along the plane of retroreflection. At a minimum, dual axis retroreflectors will retroreflect at least a portion of incident light from a source that can move within the plane of retroreflection in any combination of two directions relative to the plane of retroreflection. Light that approaches the dual-axis retroreflective elements off of their planes of retroreflection will not typically be retroreflected.

Because the imaging in connection with the present invention is accomplished using reflection, it should be noted that the reflection can be either first surface reflection or second surface reflection. First surface reflection occurs when the incident light is reflected from the first surface it strikes. Second surface reflection occurs when light is reflected from the second (or third, fourth, etc.) surface it strikes after travelling through an article. In first surface reflection, the body of the reflective article is located on the opposite side of the reflective surface relative to the side of the surface from which the light approaches, while in second surface reflection, the incident light passes into the article, travels through the body of the article, and strikes the second surface where it is reflected. The reflections at the second surface can be accomplished through the use of reflective materials, through total internal reflection, or through a combination thereof. First surface reflection, second surface reflection, or combinations of first and second surface reflection can be used connection with the optical imaging articles of the present invention.

Furthermore, although all of the prisms in the optical imaging articles illustrated in the figures include sharply defined peaks at the intersection of the facets forming the prisms, the optical imaging articles may be provided with truncated prisms, i.e., prisms in which the peak is rounded or has a shape other than the sharp ninety degree angle peaks discussed below.

Superimposed Imaging via Retroreflection

Figure 2A:
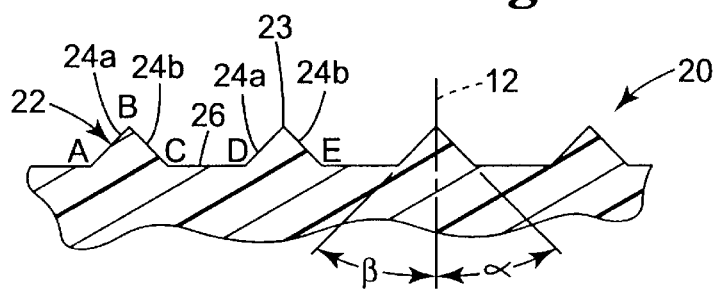
FIG. 2A is a cross-sectional view of one structured surface of the system of FIG. 1 taken along line 2A—2A.
Figure 2A:
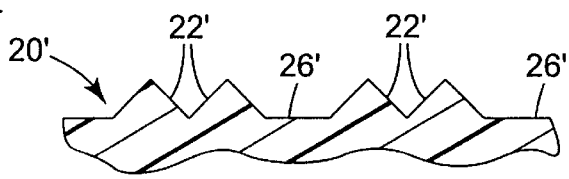
Figure 5:
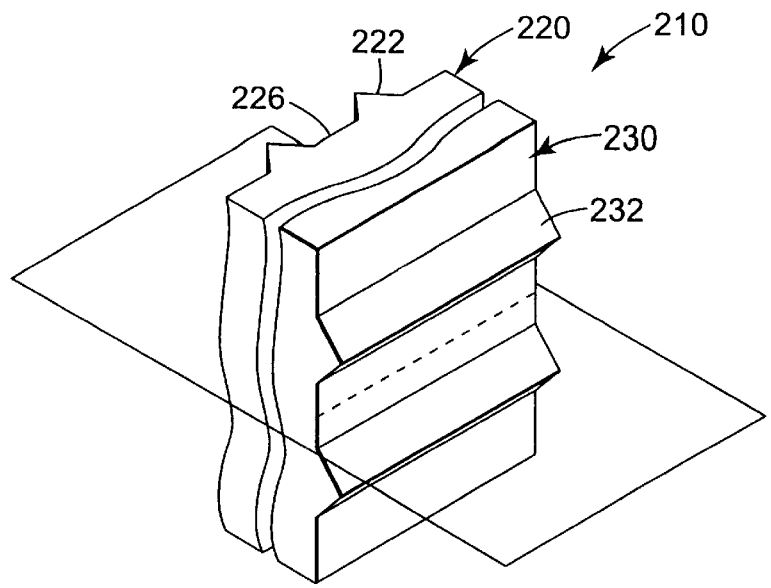
FIG. 5 is a perspective view of one retroreflective imaging system according to the present invention.
Figure 5A:
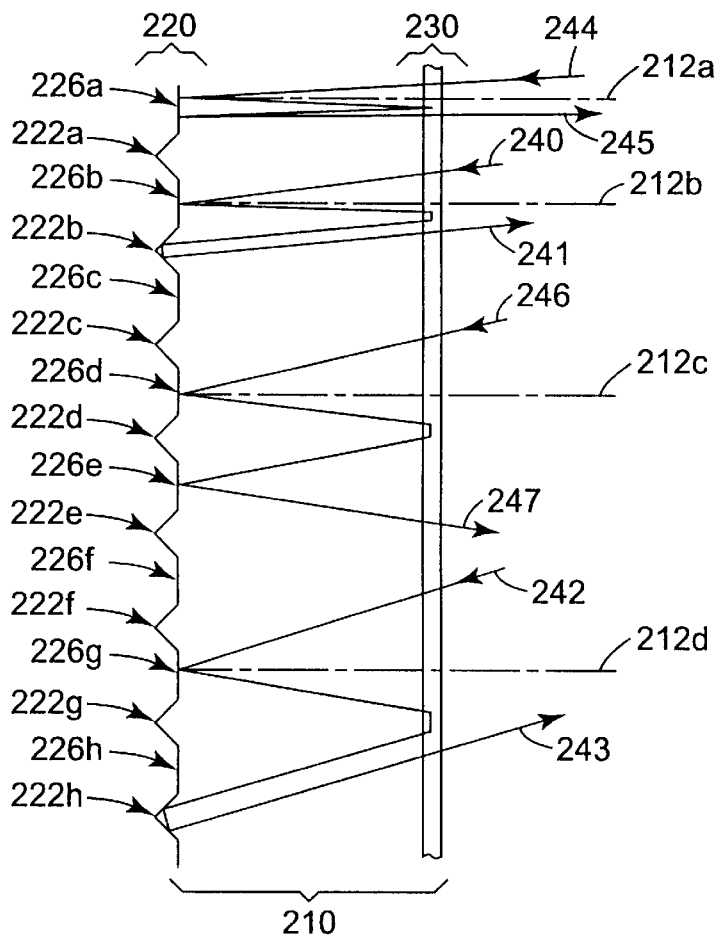
FIG. 5A is a schematic diagram of the retroreflective imaging system of FIG. 5 including illustrative rays projected onto plane 5A in FIG. 5.

FIGS. 1, 2A, 2AA, 2B, 3, 4A and 4B illustrate the principles of the invention and it should be understood that they do not necessarily illustrate useful articles. One such article is illustrated in FIGS. 5 and 5A.

FIG. 1 is a schematic illustration of the use of dual-axis retroreflective elements (90 degree prisms are illustrated) to obtain superimposed imaging via retroreflection in a retroreflective imaging system 10 including a side 20 and an opposing side 30. Both sides 20 and 30 are structured and include 90 degree prisms to cause at least a portion of the light striking both sides to retroreflect. The side 20 is intersected by axis 12 at a perpendicular angle and opposing side 30 is also intersected by axis 12 at a perpendicular angle. As a result, axis 12 will be referred to as the normal axis for both sides 20 and 30. Further, the sides 20/30 are generally parallel to each other. In connection with the above discussion, it should be noted that although both sides 20/30 are structured surfaces, they do define a plane as generally illustrated in FIG. 1, with the various structures deviating slightly from the plane.

FIG. 2A is an enlarged partial cross-sectional view of the side 20 taken along line 2A—2A in FIG. 1 and illustrates the structure of the side 20 in greater detail. That structure includes a plurality of prisms 22, with pairs of adjacent prisms 22 being separated by a planar mirror surface 26. Each of the prisms 22 is formed by two facets 24a and 24b (collectively referred to as facets 24). The facets 24 are preferably planar and also preferably intersect along a linear peak 23 to form a 90 degree angle, in other words, the facets 24 are oriented perpendicular to each other. It is further preferred that the linear peaks 23 are generally aligned with the first axis 14 (see FIG. 1).

The prisms 22 illustrated in FIG. 2A will be referred to as "normal prisms" to indicated that the facets 24 of the prisms 22 form 45 degree angles with the normal axis 12. Another characteristic of normal prisms as used herein is that the width of the sides 24a and 24b of each prism 22 are equal (i.e., in the view taken in FIG. 2A, the prisms 22 form isosceles triangles). Referring to FIG. 2A, the distance from A to B is equal to the distance from B to C in a normal prism.

It is also preferred that the width of the mirror surfaces 26 also be equal to the width of the base of the adjacent prisms 22. As seen in FIG. 2A, the distance from C to D is equal to the distance between A and C, as well as the distance between D and E. The mirror surfaces 26 preferably have a constant width and are coextensive along the first axis 14 with the prisms 22.

The prisms 22 in FIG. 2A are provided in groups of one, i.e., each pair of prisms 22 are separated by one of the mirror surfaces 26. FIG. 2AA illustrates an alternative construction in which two or more prisms 22' are provided immediately adjacent each other, with the groups of prisms 22' being separated by a mirror surface 26'. It is preferred that the width of each group of prisms 22' be equal to the width of the adjacent mirror surfaces 26'. Furthermore, although the illustrated side 20' includes groups of two prisms 22', it will be understood that more than two prisms 22' could be grouped together, provided that the width of the intervening mirror surfaces 26' was increased to equal the width of each adjacent group of prisms.

Figure 2B:
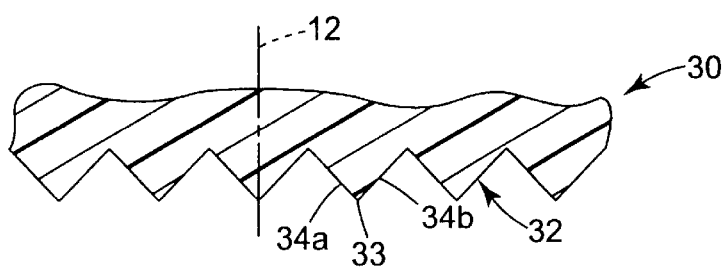
FIG. 2B is a cross-sectional view of another structured surface of the system of FIG. 1 taken along line 2B—2B.

FIG. 2B is an enlarged partial cross-sectional view of the opposing side 30 taken along line 2B—2B in FIG. 1 and illustrates the structure of side 30 in greater detail. That structure includes a plurality of prisms 32, with each of the prisms 32 being formed by two facets 34a and 34b (collectively referred to as facets 34). The facets 34 are preferably planar and also preferably intersect along a linear peak 33 to form a 90 degree angle, in other words, the facets 34 are oriented perpendicular to each other. It is further preferred that the linear peaks 33 are generally aligned with the second axis 16 (see FIG. 1). The prisms 32 illustrated in FIG. 2B are normal prisms as defined above.

It is preferred, but not required that the first axis 14 be oriented orthogonal or perpendicular to the second axis 16. As a result, the prisms 22 and mirror surfaces 26 on the first side 20 of the retroreflective system 10 are also preferably oriented perpendicular to the prisms 34 on the second surface 30. That crossed relationship provides for retroreflection as will be discussed below.

Figure 2C:
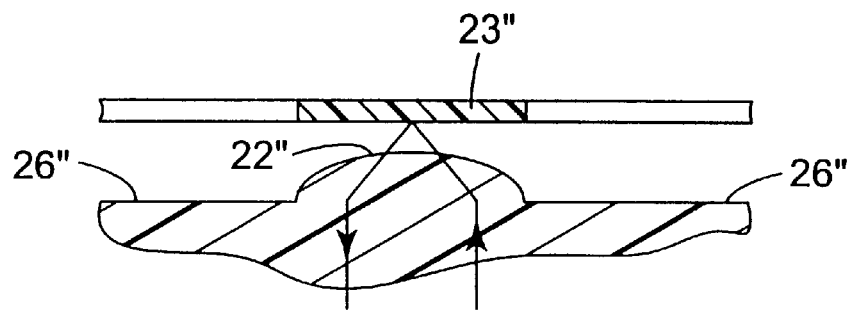
FIG. 2C is an enlarged cross-sectional view of an alternative dual-axis retroreflective element.

Furthermore, although 90 degree prisms are illustrated in connection with the retroreflective system 10 (and other discussed below), it should be understood that the dual-axis retroreflective elements may alternatively be provided as linear lenticular elements 22" located between mirror surfaces 26" as illustrated in FIG. 2C. It will typically be desirable to provide a reflective element 23" spaced behind the linear lenticular element 22" to reflect light incident thereon. Linear lenticular element 22" refracts light towards the reflective element 23" which reflects light back to the linear lenticular element 22" to accomplish dual-axis retroreflection as do the 90 degree prism structures described herein.

Figure 3:
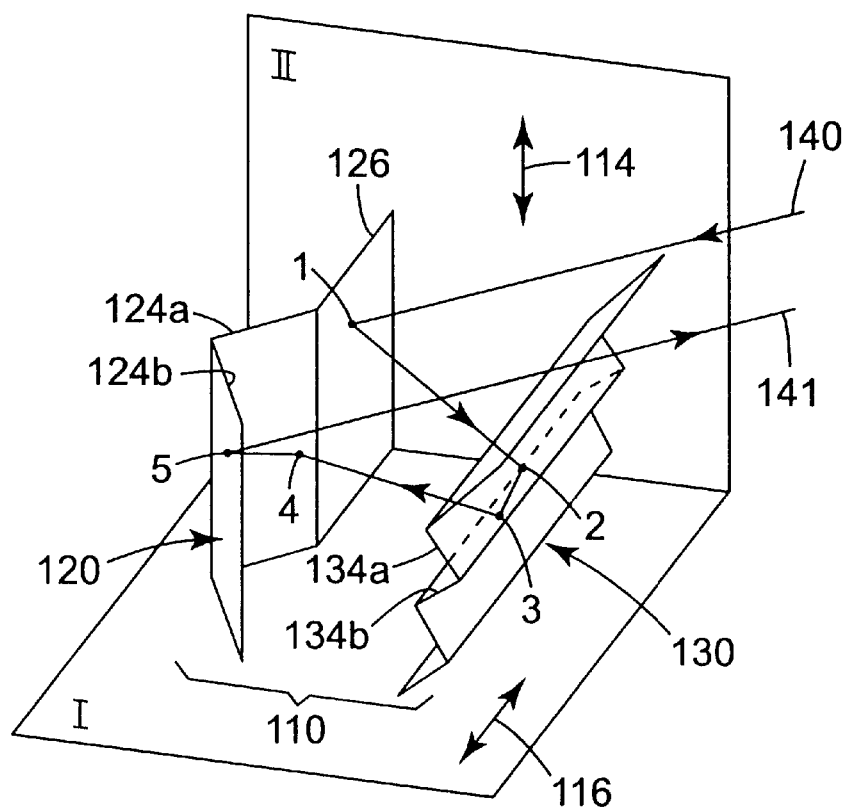
FIG. 3 is a perspective view of another retroreflective imaging system including 90 degree prisms as the dual-axis retroreflective elements.
Figure 4A:
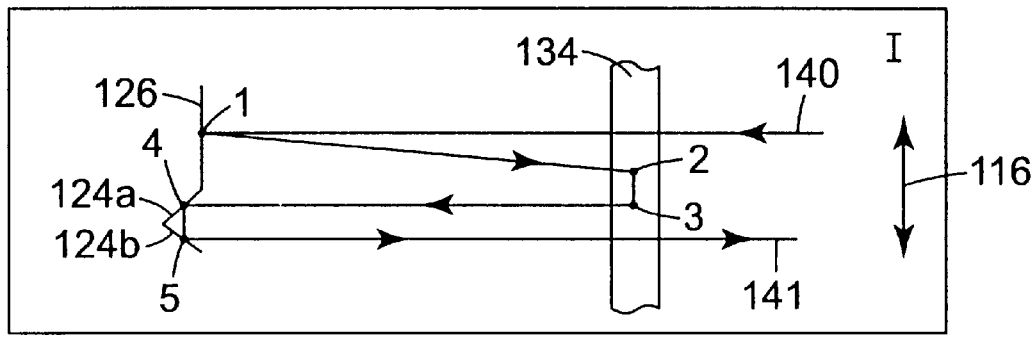
FIG. 4A is a cross-sectional view of one structured surface of the system depicted in FIG. 3 taken normal to Plane I.
Figure 4B:
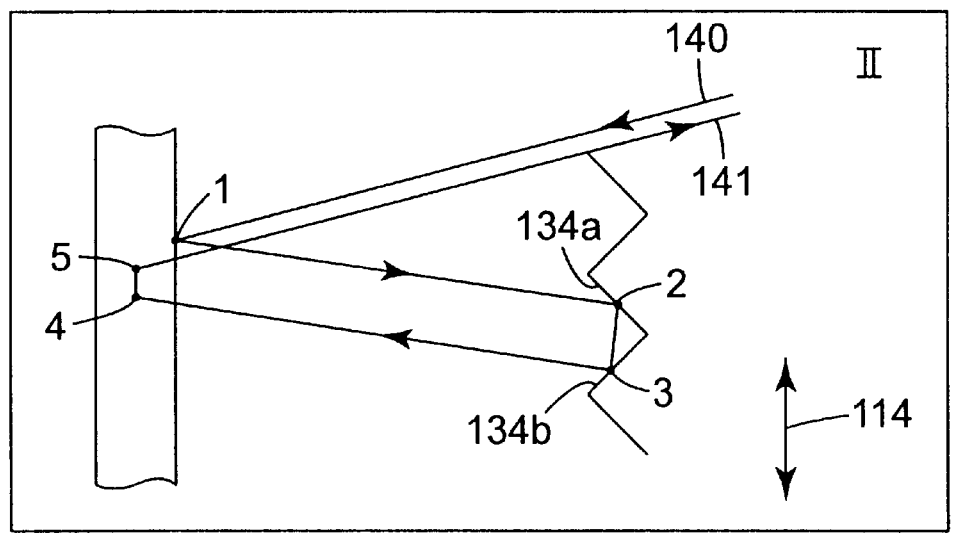
FIG. 4B is a cross-sectional view of another structured surface of the system depicted in FIG. 3 taken normal to Plane II.

Having described the structure of one retroreflective imaging system of the present invention, operation of a similar retroreflective imaging system will be described with reference to FIGS. 3, 4A and 4B. The retroreflective imaging system 110 includes sides 120/130 similar to those described above for retroreflective imaging system 10. Also illustrated in FIG. 3 are a pair of perpendicular reference planes I and II that will be used to describe operation of the retroreflective system 110. FIG. 4A illustrates the path of the light through the retroreflective system 110 as projected onto Plane I and FIG. 4B illustrates the path of light through the retroreflective system 110 as projected onto Plane II.

Ray 140 of light is illustrated as incident on side 120 where it strikes the mirror surface 126 at point 1. From point 1, the ray is reflected to point 2 on one of the facets 134a on the opposing side 130. From point 2, the light is reflected to point 3 on the facet 134b where it is reflected towards point 4 on the facet 124a of side 120. From point 4, the light is reflected towards point 5 on facet 124b where it is reflected out of the retroreflective article as retroreflected ray 141 of light. The paths of the incident light 140 and the retroreflected light 141 are preferably parallel to each other as seen in FIGS. 3, 4A and 4B.

It is preferred that the mirror surface 126, facets 124a, 124b, 134a and 134b all provide for specular reflection of light incident thereon. That reflection can be achieved by the use of reflective coatings/materials, by total internal reflection, or by a combination of reflective coatings/materials and total internal reflection depending on the structure of the retroreflective article.

Careful examination of FIGS. 1–4B shows that rays entering the retroreflective imaging systems are incident on side 20/120 after first passing through the plane of opposing side 30/130. For practical applications, the illustrated system can be considered as a single cell or pixel in a larger system where the entry points for light entering the structures are windows located about the cell or pixel.

As illustrated in FIGS. 3, 4A and 4B, the retroreflective system reflects light along the same path followed by the light when incident on the system. The two paths are, however, slightly offset due to the reflections between facets in the prisms. Generally, however, those differences are minor and can be disregarded.

When the offset differences are disregarded, the retroreflection illustrated in FIG. 3 can be characterized as perfect retroreflection, in other words, incident light is reflected directly back to its source. In, for example, applications such as road signs, the light source is a vehicle headlight and the observer is the vehicle driver. Because the driver's eyes are typically located above the headlight, perfect retroreflection may not be preferred as it returns light to the headlight, not the driver. As a result, retroreflectors designed for road signs are typically not perfect retroreflectors because some of the retroreflected light is preferably spread out slightly to allow observation of the retroreflected by a driver who is not located at the headlight.

One problem with providing imperfect retroreflectors is that the divergence in the reflected light is generally in many directions around the axis of perfect retroreflection. In other words, in addition to some light diverging towards the driver, light also diverges to the sides of the headlight and below the headlight. The divergent reflected light that is not directed towards the driver is, in essence, lost for purposes of assisting the driver in viewing the retroreflective article.

By using retroreflective articles as described above, however, more precise control over the divergence profile of the reflected light can be obtained. When used in conjunction with 90 degree prisms as the dual-axis retroreflective elements, control is obtained in two different planes corresponding to the two different sets of prisms on the two sides of the retroreflective article. Furthermore, the divergence in each plane can be controlled independently. Referring to FIGS. 3 and 4B, for example, we can assume that Plane II is oriented vertically and Plane I is oriented horizontal. If it is desired to provide for vertical divergence in the reflected light such that more of the light is reflected from the headlight to a driver's eyes located vertically above the headlight, the angle formed by the facets 134$a$ and 134$b$ can be increased, thereby spreading the reflected light vertically. For example, the angle between facets 134$a$ and 134$b$ can be increased from 90 degrees to, e.g., 90 degrees, 10 minutes, thereby spreading the reflected light over a range of 90 degrees plus or minus 20 minutes. That vertical divergence profile can be controlled independently of the horizontal divergence (as would be seen in the projection onto Plane I (see FIG. 4A).

Another feature or characteristic of retroreflective imaging articles including prisms is their ability to provide flashing retroreflection in response to relative movement between a light source and the retroreflective article. This concept is illustrated in FIGS. 5 and 5A, where the retroreflective article 210 includes a side 220 and an opposing side 230. A variety of incident light rays are depicted in FIG. 5A (which is a cross-sectional view of the article 210 along Plane 5A seen in FIG. 5) to illustrate the variety of effects obtainable using retroreflective imaging article 210. These rays are shown as they are projected into the plane of the paper of FIG. 5A.

The retroreflective article side 220 includes a plurality of prisms 222$a$–222$h$ (collectively referred to as prisms 222), all of which extend into the page in the view depicted in FIG. 5A. In between each pair of adjacent prisms 222, is one of the mirror surfaces 226$a$–226$h$ (collectively referred to as mirror surfaces 226). The structure of the side 220 is largely similar to sides 10 and 110 of the systems described above The opposing side 230 preferably includes a plurality of prisms similar to the sides 30 and 130 of the systems described above, although in the view of FIG. 5A only one of the prisms is seen because the other prisms are behind the prism seen on side 230 in FIG. 5A.

Incident light ray 240 illustrates one possible result for light incident on retroreflective article 210 in which the reflected light ray 241 is retroreflected. The light is reflected on the side 220 by both the mirror surface 226$b$ and the prism 222$b$ that is immediately adjacent the mirror surface 226$b$ (after intervening reflections on the retroreflective article's opposing side 230). Because the incident light ray 240 is reflected from a mirror surface 226$b$ and an immediately adjacent prism 222$b$, incident light ray 240 and its corresponding reflected light ray 241 are an example of what will be referred to as "first order" retroreflection by the retroreflective article 210.

Incident light ray 242 illustrates another case of retroreflection using the retroreflective article 210 in which the incident light ray 242 is reflected from mirror surface 226$g$ and prism 222$h$ which is separated from the mirror surface 226$g$ by an intervening prism 222$g$ and mirror surface 226$h$. Because the mirror surface $2^26g$ and prism 222$h$ used to retroreflect incident light ray 242 are separated by the intervening structures, incident light ray 242 and its reflected light ray 243 illustrate an example of "second order" retroreflection from the retroreflective article 210. It will be understood that third order retroreflection, fourth order retroreflection, etc. are also possible where increasing distance between the mirror surface 226 and prism 222 is experienced by retroreflected light.

Incident light ray 244 illustrates one possible result for light incident on retroreflective article 210 which is that the reflected light ray 245 is not retroreflected. As seen in FIG. 5A, the light is reflected from the mirror surface 226$a$ twice and is not reflected by any of the prisms 222 on the retroreflective article's first side 220. In most cases in which the retroreflective article 210 retroreflects light, the retroreflected light must be reflected at least once by both a mirror surface 226 and one of the prisms 222. In a situation in which the light is reflected twice by the mirror surfaces 226 as seen with incident light ray 244, retroreflection will not occur. In general, light approaching the retroreflective article 210 at angles similar to the approach angle of incident light ray 244 will experience the same reflections and will not be retroreflected. Similarly, although not shown, light that is reflected by two different prisms 222 on side 220 will also not be retroreflected (because that light is not reflected by one each of the prisms 222 and the mirror surfaces 226).

Incident light ray 246 illustrates another example of an incident light ray 246 that is not retroreflected by the retroreflective article 210. In this example, the incident light ray 246 is reflected by two different mirror surfaces 226$d$ and 226$e$ on the retroreflective article's side 220. Because the light is not reflected by any of the prisms 222 on the side 220, it is not retroreflected (although it is reflected).

It should be understood that the relationships described above and illustrated in FIG. 5A will also hold for planes perpendicular to the plane illustrated in FIG. 5A, i.e., planes perpendicular to the plane of the paper on which FIG. 5A is located.

The progression of incidence angles of the incident light rays 244, 240, 246 and 242 when moving from the top to the bottom of the retroreflective article depicted in FIG. 5A illustrates the flashing retroreflective effect provided by the retroreflective article 210. The incidence angle of the rays 244, 240, 246 and 242 as measured relative to the normal axes 212a, 212b, 212c and 212d (respectively) increases. As discussed above, the incident light ray 244 with the smallest incidence angle relative to normal axis 212a is not retroreflected. Increasing the incidence angle, however, causes incident light to be retroreflected as is illustrated by incident light ray 240 and its counterpart retroreflected ray 241. Further increasing the incidence angle as illustrated by ray 246, however, disrupts the retroreflection of light. Still further increasing the incidence angle of the light as illustrated by ray 242 moves the light again into retroreflection as seen in retroreflected light ray 243.

In other words, as a light source and the retroreflective article 210 are moved relative to each other such that the angle of incidence of light from the source on the retroreflective article 210 is changing, an observer may view flashes of retroreflected light as the light is alternately retroreflected and not retroreflected. Typically, the structures in the retroreflective article 210 are relatively small, e.g., prisms 222 with facets having a width of about 0.36 mm (about 0.014 inches) and the distance between the sides 220 and 230 is relatively large in comparison, e.g., about 10 mm to about 40 mm. As a result, the difference in incidence angle required to move between retroreflection and non-retroreflection may be relatively small, e.g., on the order of about one degree or less.

One example of a situation in which the incidence angle of light on a retroreflective article changes occurs as a vehicle and driver approach a sign located on the side of road, where the angle between the light source/observer changes as the vehicle approaches the sign. Because the incidence angle changes more rapidly as the vehicle approaches the sign, the rate of flashing retroreflection also increases which can further improve conspicuity of the retroreflective article. Such conspicuity may be exploited in some special applications such as exit lanes, wrong-way signs, truck lanes, road edges with limited shoulders, etc.

As described above, the retroreflective imaging systems/articles have include planar opposing sides that are parallel to each other. It should, however, be understood that the retroreflective imaging systems/articles of the present invention may also include systems/articles in which the opposing planar sides are not parallel to each other.

One significant difference between the retroreflective systems/articles with nonparallel sides and the retroreflective systems/articles including parallel sides as described above is that the retroreflective systems/articles with parallel sides all exhibit flashing retroreflection as illustrated in FIGS. 5 and 5A. In contrast, retroreflective imaging systems/articles can exhibit retroreflection regardless of the angle of incidence of light (provided the light approaches within the operating range of the retroreflective article). In other words, sweeping light over a range of incidence angles may not cause an observer to view flashes of retroreflected light.

The retroreflective imaging article 410 illustrated in FIGS. 6, 7 and 8A–8C illustrates another retroreflective imaging article that exhibits flashing retroreflection with an effective aperture of 100% within its working range. In other words, for those approach angles at which the article 410 is retroreflective, all of the light incident on the article is retroreflected. Because the article 410 is a flashing retroreflector, however, there are approach angles at which no light is retroreflected.

The retroreflective imaging article 410 may find particular advantages when used as a flashing retroreflective raised pavement marking. The retroreflective article 410 includes a face 420 located on the bottom of the pavement marking and an opposing face 430 located on the top of the pavement marking. Also included are two optical windows 411 and 413 at opposite ends of the pavement marking and two sidewalls 415 and 417 located on opposite sides of the pavement marking. The pavement marking is preferably provided as a six-sided prismatic solid.

Figure 6:
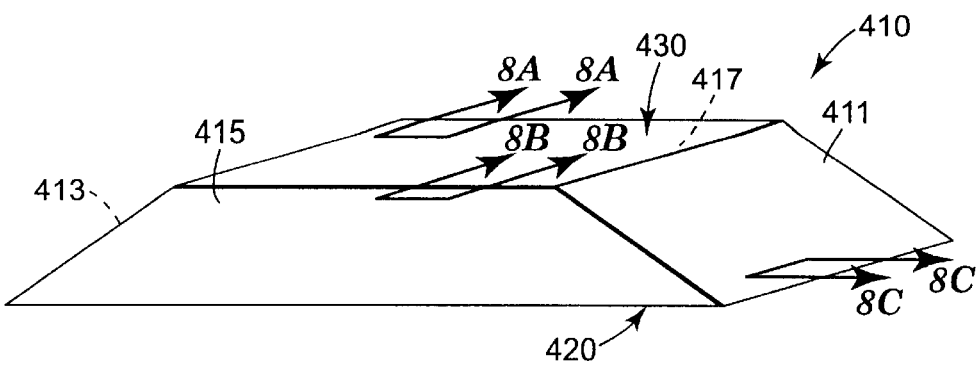
FIG. 6 is a perspective view of a two-way retroreflective imaging system including structured surfaces with 90 degree prisms as the dual-axis retroreflective elements.
Figure 7:
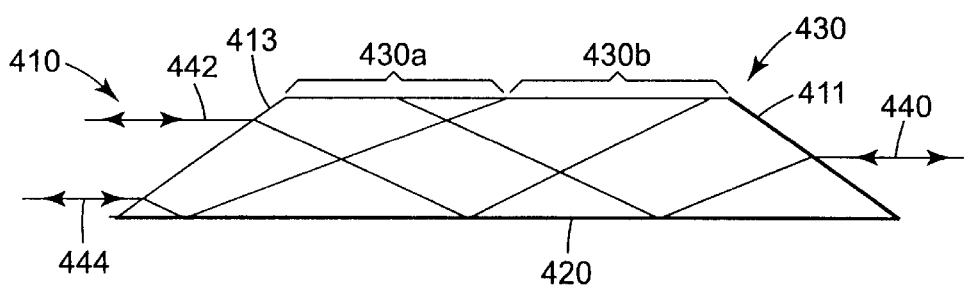
FIG. 7 is a side elevational view of the system of FIG. 6.

FIG. 7 is a side elevational view of the retroreflective article 410 in which incident light rays 440, 442 and 444 are depicted as entering the retroreflective article 410 through one of the windows 411 or 413 and being retroreflected therefrom. The retroreflective article's first face 420 is seen in an enlarged partial cross-sectional view in FIG. 8C (a view along line 8C—8C in FIG. 6) and includes a plurality of prisms 422 that preferably extend from one window 411 to the window 413 on the opposite end of the pavement marking. Each of the prisms 422 is formed by two facets 424a and 424b. A planar mirror surface 426 preferably separates each pair of adjacent prisms 422 and also preferably extends the length of the pavement marking.

Figure 8A:
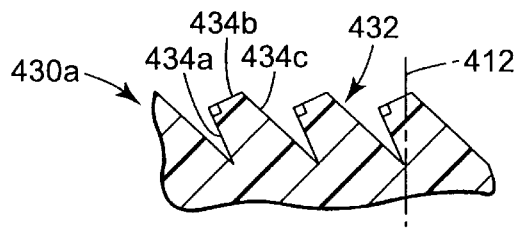
FIG. 8A is a cross-sectional view of a structured surface of the system of FIG. 6 taken along line 8A—8A.
Figure 8B:
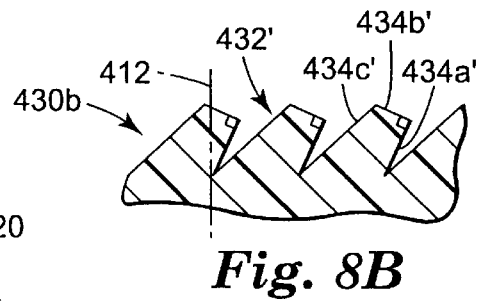
FIG. 8B is a cross-sectional view of a structured surface of the system of FIG. 6 taken along line 8B—8B.
Figure 8C:
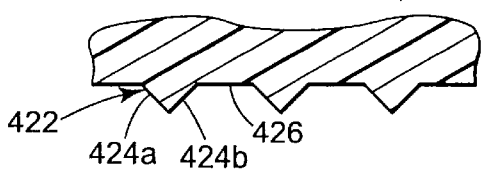
FIG. 8C is a cross-sectional view of a structured surface of the system of FIG. 6 taken along line 8C—8C.

FIGS. 8A and 8B illustrate the face 430 (top surface) of the retroreflective article 410 as seen in FIGS. 6 and 7. The face 430 is separated into two sections 430a and 430b as seen in FIG. 7 and the section 430a is depicted in an enlarged partial cross-sectional view in FIG. 8A. The section 430a includes prisms 432 that preferably extend from one side 415 of the pavement marker to the opposite side 417. Each of the prisms is formed by a pair of planar facets 434a and 434b. Each of the prisms 432 is preferably canted towards window 411 to improve its effective aperture for light approaching from the window 411 as will be discussed below.

Section 430b is depicted in an enlarged partial cross-sectional view in FIG. 8B. The section 430b includes prisms 432' that preferably extend from one side 415 of the pavement marker to the opposite side 417. Each of the prisms is formed by a pair of planar facets 434a' and 434b'. Each of the prisms 432' is preferably canted towards window 413 to improve its effective aperture for light approaching from the window 413 as will be discussed below.

Exemplary incident light rays 440, 442 and 444 illustrate the advantages of canting the prisms 432 and 432' on the retroreflective article's face 430. Ray 440 enters the retroreflective article 410 through window 411 and is refracted downward towards the face 420 where it reflects upwards towards the section 430a including prism 432 as depicted in FIG. 8A. Because the light from optical window 411 approaches the prisms 432 in the first section 430a at a relatively large angle off of the normal axis 412 (see FIG. 8A), canting of the prisms 432 can significantly improve the effectiveness of the retroreflective article 410 in retroreflecting light entering through the window 411. The extreme canting that may be required causes the need for separation surfaces 434c between the prisms 432 to allow for the formation of 90 degree prisms as illustrated.

Rays 442 and 444 illustrate light entering the retroreflective article 410 through the optical window 413. The rays 442 and 444 are refracted towards the face 420 where they are reflected upwards towards the second section 430b of prisms 432'. Canting of the prisms 432' also improves their ability to retroreflect light approaching at relatively large angles off of the normal axis 412 (see FIG. 8B). Rays 442 and 444 which enter the optical window 413 near its top and bottom, respectively, illustrate that light entering near the top of the window 413 will typically be refracted and reflected towards the farthest end of the second section 430b (near the window 411). In contrast, light entering near the bottom of the optical window 413 will typically be refracted and reflected towards the near end of the second section 430b (near the middle of the retroreflective article 410.

Figure 9:
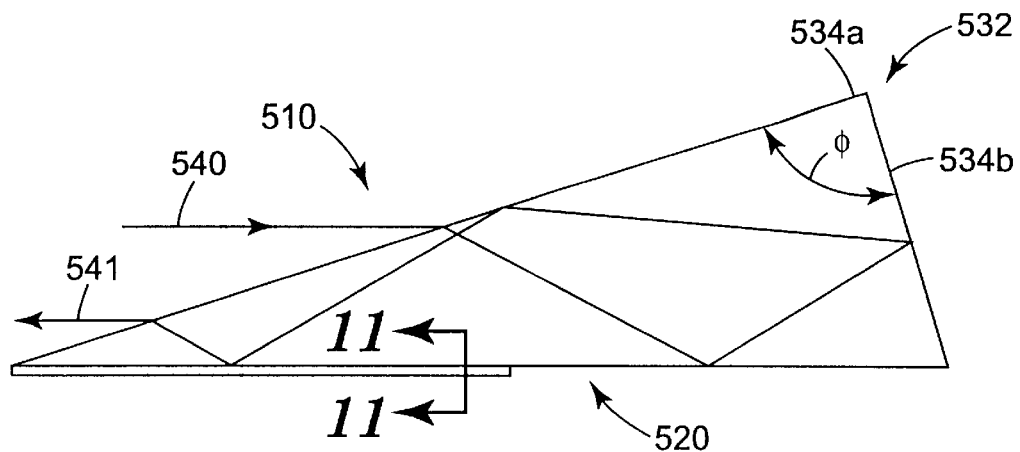
FIG. 9 is a side elevational view of another retroreflective imaging article including 90 degree prisms as the dual-axis retroreflective elements.
Figure 10:
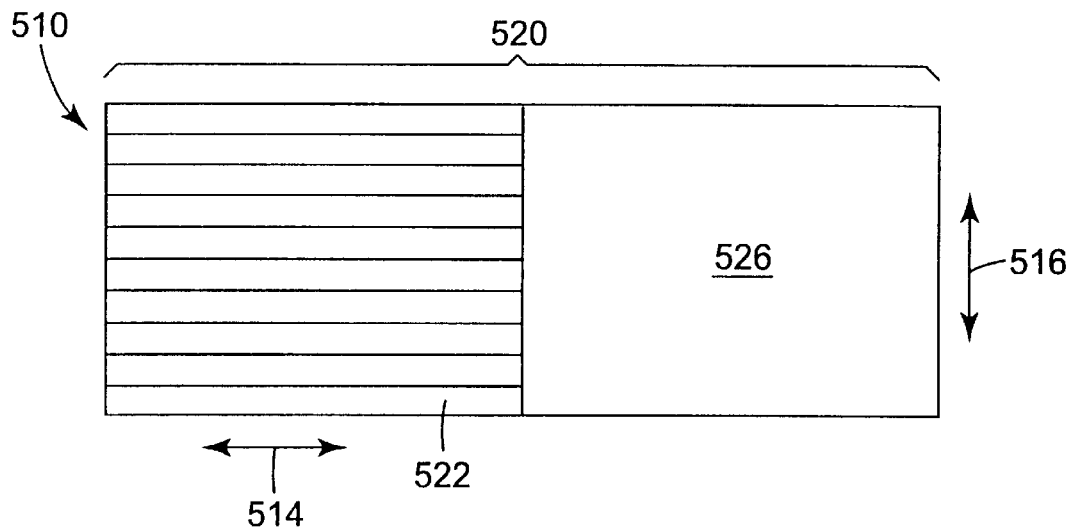
FIG. 10 is a bottom view of the retroreflective imaging article of FIG. 9.
Figure 11:
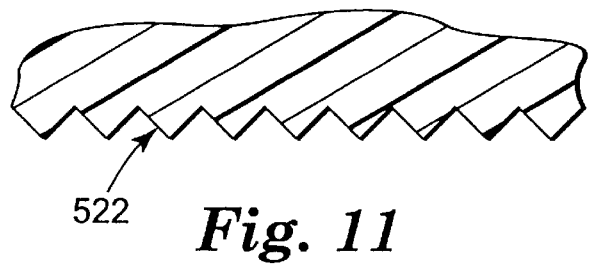
FIG. 11 is a cross-sectional view of a structured surface of the article of FIG. 9 taken along line 11—11.

FIGS. 9, 10 and 11 illustrate another retroreflective imaging article 510 that provides constant (non-flashing) retroreflection and a 100% effective aperture. In other words, for light rays approaching the retroreflective article 510 at angles that are retroreflected (i.e., that are within the working limits of the retroreflector), substantially all of the light is retroreflected (disregarding losses due to absorption, interface reflection, etc.). The imaging article 510 may be particularly useful as a non-flashing retroreflective pavement marking.

The article 510 includes a side 520 that is located on the bottom of the pavement marking, The first side is depicted in a plan view in FIG. 10 and it differs from the sides 20/120/220/420 described above in that the prisms 522 are separated from the mirror surface 526. As illustrated in the enlarged cross-sectional view of FIG. 11, the prisms 522 are located immediately adjacent each other and preferably extend along the axis 514 for a portion of the length of the first side 520.

The opposing prism 532 is formed by facets 534a and 534b. The facets are preferably oriented perpendicular to each other, although some variation in the angle may be desired to provide divergence in a vertical plane for reflected light as described above. Facet 534a is preferably planar. Unlike the retroreflective article described above, the retroreflective article 510 includes only a single prism 532 opposite from the side 520. The prism 532 preferably extends across the width of the retroreflective article 510 along the axis 516 (see FIG. 11).

The facet 534a of the prism 532 also functions as an optical window for the retroreflective article 510 and, in that role, it transmits light into the retroreflective article 510. Exemplary incident light ray 540 is transmitted through the facet 534a and is refracted down to the mirror surface 526 of the side 520. From the mirror surface, the light is reflected by the facets 534b and 534a towards the prisms 522 on the side 520. From the prisms 522, the light is retroreflected as ray 541. For retroreflection, any light transmitted into the article 510 must reflect from the prisms 522 and the mirror surface 526 at least once, although it can reflect from the prisms 522 and the mirror surfaces 526 in any order.

Figure 9A:
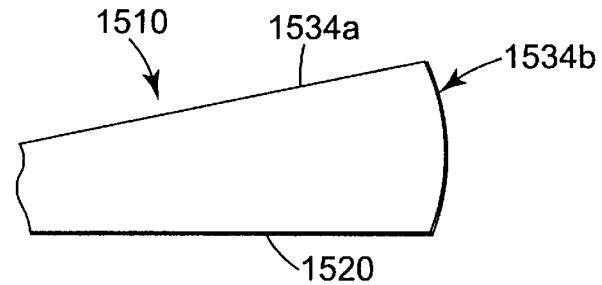
FIG. 9A is a partial view of an alternative retroreflective imaging article.
Figure 9B:
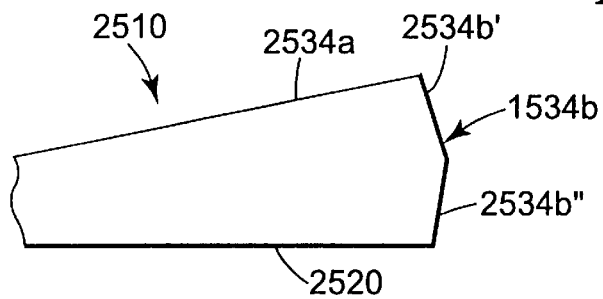
FIG. 9B is a partial view of an alternative retroreflective imaging article.
Figure 9C:
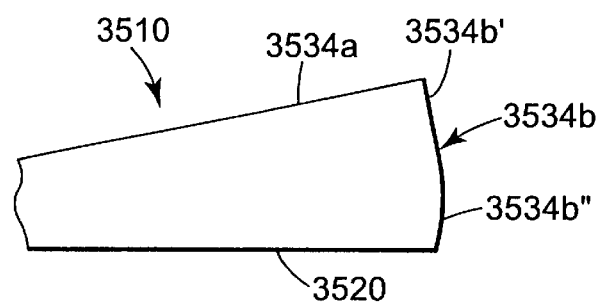
FIG. 9C is a partial view of an alternative retroreflective imaging article.

FIGS. 9A–9C illustrate alternative structures for the prism opposite the surface 520 of article 510. Although three illustrative embodiments are specifically described, it will be understood that many other variations could be provided within the scope of the present invention. Furthermore, the angles formed between the various surfaces and the curvatures of the curved surfaces are exaggerated for the purposes of illustration.

FIG. 9A illustrates an article 1510 that includes a surface 1520 constructed similar to surface 520 in article 510. The opposing facet 1534a is also constructed similar to the facet 534a of article 510. The differences between articles 510 and 1510 are found in the surfaces denoted by reference numbers 534b and 1534b. Surface 534b is described above as a planar facet. Surface 1534b of article 1510 is formed as a curved surface which may improve the divergence of reflected light in a vertical plane, e.g., the plane of the paper on which FIG. 9A is located. Surface 1534b is preferably, but not necessarily, a portion of the surface of a cylinder, more preferably a right circular cylinder.

FIG. 9B depicts a retroreflective imaging article 2510 that includes a surface 2520 constructed similar to surface 520 in article 510 and an opposing facet 2534a is also constructed similar to the facet 534a of article 510. The differences between articles 510 and 2510 are found in the surfaces denoted by reference numbers 534b and 2534b. Surface 534b is described above as a planar facet. Surface 2534b of article 2510 is formed from a plurality of planar sub-facets 2534b' and 2534b". The orientation of each of the sub-facets 2534b' and 2534b" relative to facet 2534a is different, resulting in retroreflection of a light incident on facet 2534a for two different ranges of observation angles. In other words, light incident on facet 2534a for one range of observation angles will be retroreflected using sub-facet 2534b' and light incident on facet 2534a at another range of approach angles will be retroreflected using sub-facet 2534b". The two ranges of observation angles may substantially overlap with differences seen only at the extremes.

FIG. 9C depicts yet another variation in which one portion 3534b' of the surface 3534b of the retroreflective imaging article 3510 is planar and oriented generally perpendicular to the facet 3534a. Another portion 3534b" of the surface 3534b is curved (similar to surface 1534b described above) to improve divergence of the retroreflected light in a vertical plane, resulting in improved performance over a range of observation angles.

Having thus described a variety of illustrative retroreflective imaging systems/articles, we can now turn to displaced or retrotransmissive imaging systems/articles.

Displaced Optical Imaging

As described above, optical imaging articles including prisms and other suitable dual-axis retroreflective elements can be used to provide superimposed images through retroreflection. A second class of optical imaging articles will now be described that also include prisms (and other suitable dual-axis retroreflective elements), but which use the dual-axis retroreflective elements to achieve displaced imaging.

Retrotransmission

To achieve displaced imaging through retrotransmission, the retrotransmissive articles manipulate incident light such that light entering the retrotransmissive articles at one entrance angle relative to a normal axis will exit the article at an exit angle (relative to that same normal axis) that is equal but opposite in sign to the entrance angle of the light. By so doing, retrotransmissive articles according to the present invention can provide images that appear displaced from the retrotransmissive article.

Figure 12:
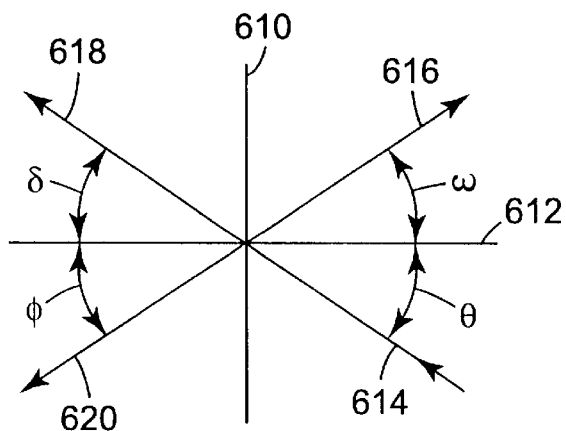
FIG. 12 illustrates specular reflection, retroreflection, transmission and retrotransmission.

FIG. 12 is a schematic diagram that illustrates the concept of retrotransmission relative to transmission, reflection and retroreflection. The article 610 (which may be transmissive, reflective, retroreflective, or retroreflective) is depicted as a single vertical line in FIG. 12, although it will be understood that such articles 610 will typically have some thickness. It will also be understood that FIG. 12 is a simplified diagram and does not depict any shifting of the light due to refraction or retroreflection as will be well understood by those skilled in the art.

The article 610 defines a normal axis 612 that is perpendicular to the plane in which article 610 is located. Incident light 614 is depicted as approaching the article 610 at an angle $\theta$ below the normal axis 612.

If the light 614 is retroreflected, it will typically return along substantially the same path it traveled to reach the article 610, i.e., the light is reflected approximately 180 degrees from the incident light (with some variations possible due to imperfect retroreflection). Specular reflection of incident light 614 from the article 610 is depicted as ray 616 in FIG. 12. The reflected ray 616 travels at an angle $\omega$ above the normal axis 612 and is equal in magnitude, but opposite in sign, of the angle $\theta$ at which incident light 614 approaches the article 610. If incident light 614 is transmitted through article 610, its path is illustrated by ray 618 in FIG. 12. The path of ray 618 is offset by an angle δ above the normal axis 612. Angle δ formed by transmitted ray 618 is equal in magnitude and of the same sign as the angle α formed by incident ray 614 with respect to the normal axis 612.

If the incident ray 614 is retrotransmitted by the article 610, it will travel along the path depicted by ray 620 in FIG. 12. The retrotransmitted ray 620 will preferably travel along a path that forms an angle φ below the normal axis 612 that is equal in magnitude, but opposite in sign, to angle θ formed by the incident ray 614 with the normal axis 612. The difference between transmission and retrotransmission is that the transmitted ray 618 exits article 610 on the opposite side of the normal axis 612 as compared to the incident ray 614 while the retrotransmitted ray 620 exits article 610 on the same side of the normal axis 612 as the incident ray 614. It will be understood that all of the rays depicted in FIG. 12 are in the plane of the figure.

Figure 13:
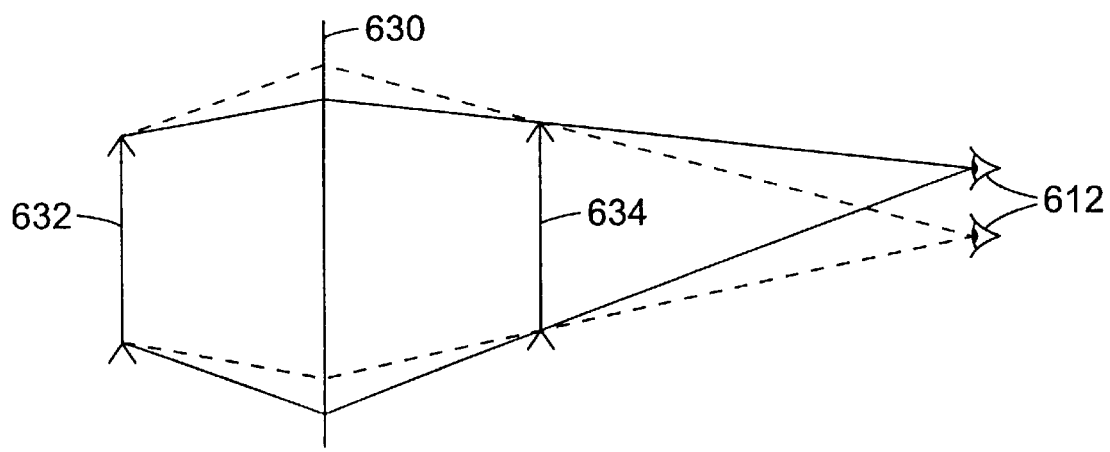
FIG. 13 illustrates retrotransmission of an image.

One result of retrotransmission is depicted in FIG. 13 where, for example, an object 632 located on one side of a retrotransmissive article 630 forms a retrotransmitted image 634 on the opposite side of the article 630 that will appear to be located in free space in front of the article 630 to a viewer with eyes 636 located in front of the article 630. The projection distance, i.e., the distance that the retrotransmitted image 634 will appear to be displaced from the retrotransmissive article 630 will typically be equal to the distance that the object 632 is located behind the retrotransmissive article 630.

Retrotransmission of light can occur in one plane or in two perpendicular planes. For the purposes of the present invention, retrotransmission in only one plane will be defined as "limited retrotransmission" while retrotransmission in two mutually perpendicular planes will be defined as "unlimited retrotransmission" and both forms of retrotransmission will be described more completely below.

Limited Retrotransmission

Figure 14:
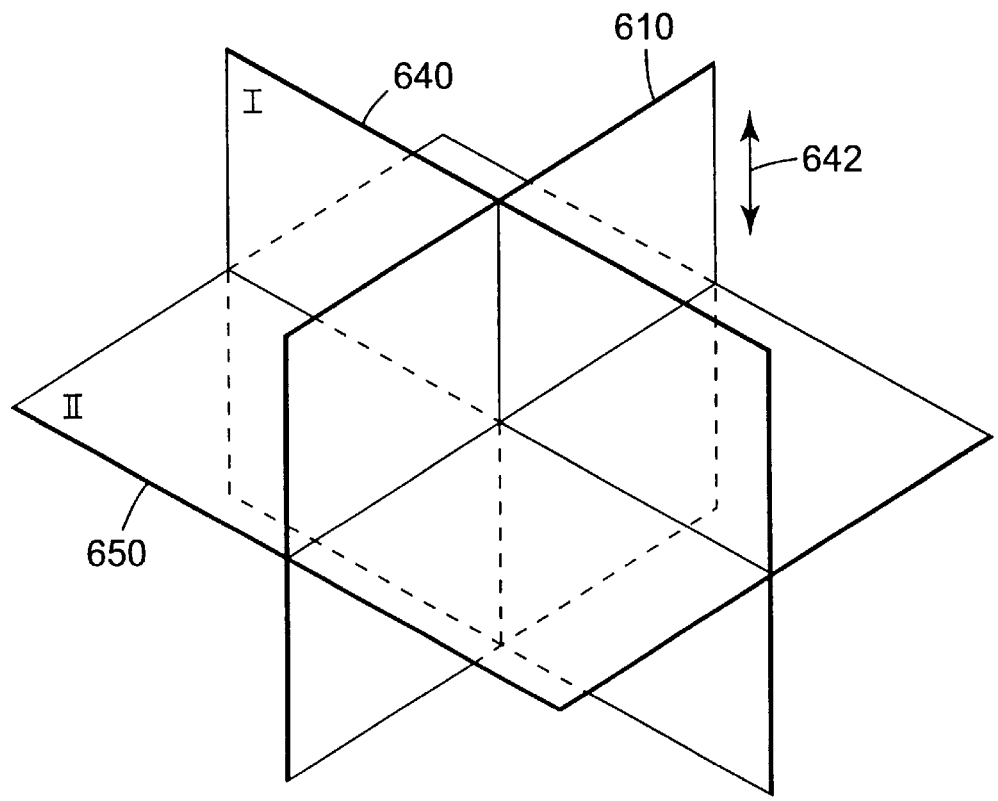
FIG. 14 illustrates a retrotransmissive article and two mutually perpendicular planes intersecting the article.

FIG. 14 can be used as a frame of reference to assist in understanding limited retrotransmission. A retrotransmissive article 610 is illustrated as a plane in FIG. 14 for simplicity although it will typically have some thickness. A vertical plane 640 is shown intersecting the retrotransmissive article 610. The vertical plane is also referenced as Plane I in FIG. 14. A horizontal plane 650, also referenced as Plane II, is shown as intersecting both the retrotransmissive article 610 and the vertical plane 640. For the sake of simplicity, the planes 640 and 650, along with the plane of article 610, can be considered to be mutually perpendicular to each other.

Figure 15:
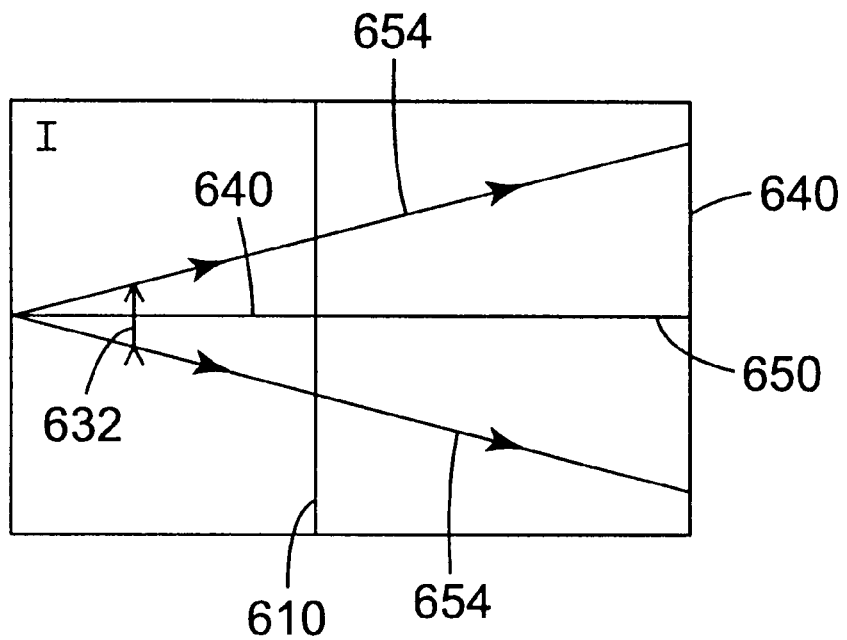
FIG. 15 is a view of the retrotransmissive article of FIG. 14 taken normal to Plane I.

Because the retrotransmissive article 610 exhibits only limited retrotransmission, light transmitted through the retrotransmissive article 610 is retrotransmitted in only one of the vertical and horizontal planes 640 and 650. FIG. 15 is view of the system of FIG. 14 along horizontal plane 650 (depicted as line 650 in FIG. 15). As seen there, light 644 approaching from the left side of the retrotransmissive article 610 is transmitted through the article 610 without retrotransmission, i.e., it exits the retrotransmissive article 610 at substantially the same angle relative to horizontal plane 650 as it enters the retrotransmissive article 610 (with some minor displacement that is not shown).

Figure 16:
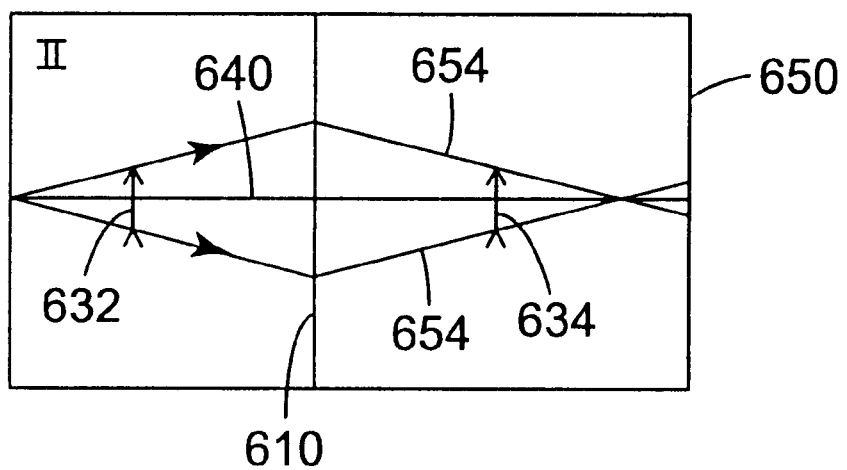
FIG. 16 is a view of the retrotransmissive article of FIG. 14 taken normal to Plane II.

FIG. 16 is a view of the system of FIG. 14, but is taken along vertical plane 640 (depicted as line 640 in FIG. 16). Light 654 approaching from the left side of the retrotransmissive article 610 exits the right side of the article 610 at an equal, but opposite, angle relative to the vertical plane 640 as it enters the retrotransmissive article 610 (with some minor displacement that is not shown). The result is that an image of the object 632 on the left side of the retrotransmissive article is retrotransmitted to the right side of the article 610, resulting in a retrotransmitted image 634 on the right side of the article 610 in Plane II, but not in Plane I. The retrotransmitted image 634 is also visible in planes that are also perpendicular to Plane I and that intersect the object 632 on the left side of the retrotransmissive article 610.

The retrotransmission illustrated in FIGS. 14–16 is described as "limited retrotransmission" because only observers viewing the retrotransmissive article 610 along Plane II and with both eyes located in Plane II (and any other planes that also intersect the object 632 and are perpendicular to Plane I) will observe the retrotransmitted image 634. In contrast, an observer not viewing the retrotransmissive article 610 from the right side along one of the retrotransmissive planes will not view a retrotransmitted image of the object 632. Plane II and any other planes along which retrotransmission can occur (i.e., planes that intersect the object 632 and are perpendicular to Plane I) will be referred to herein as "retrotransmissive planes" or "planes of retrotransmission" because the retrotransmitted image is visible only to observers viewing the retrotransmissive article 610 along one of those planes.

Furthermore, because the retrotransmissive properties are limited to observers viewing the retrotransmissive article 610 along its retrotransmissive plane, the retrotransmissive article 610 may be useful in alignment mechanisms in which it is desirable to allow only observers located in a particular spatial orientation relative to the retrotransmissive article 610 to view the retrotransmitted image.

Unlimited Retrotransmission

Figure 17:
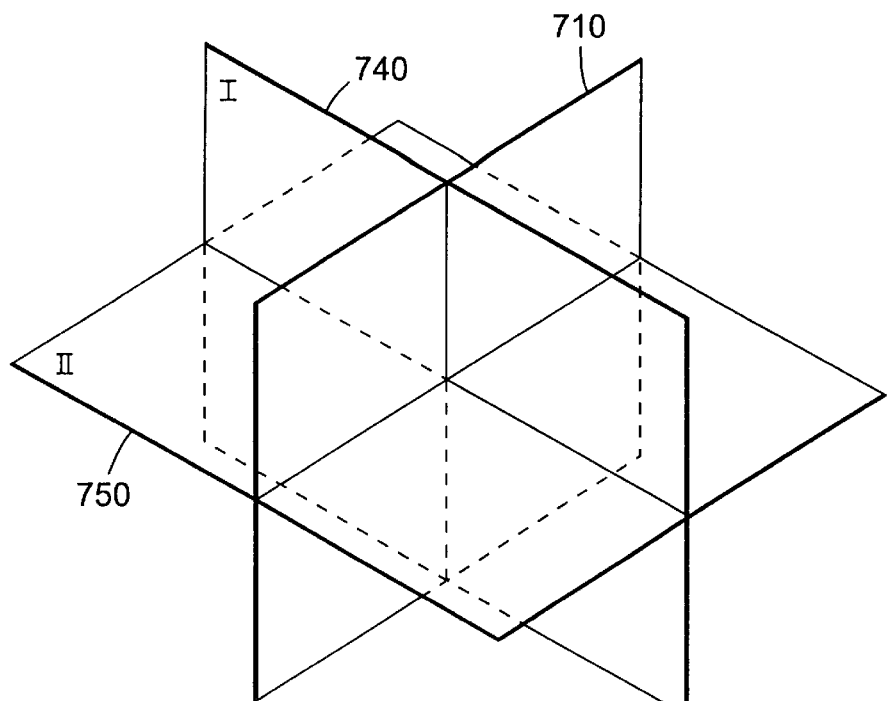
FIG. 17 illustrates a retrotransmissive article and two mutually perpendicular planes intersecting the article.

FIG. 17 can be used as a frame of reference to assist in understanding unlimited retrotransmission. A retrotransmissive article 710 is illustrated as a plane in FIG. 17 for simplicity although it will be understood that the article 710 will typically have some thickness. A vertical plane 740 is shown intersecting the retrotransmissive article 710. The vertical plane is also referenced as Plane I in FIG. 17. A horizontal plane 750, also referenced as Plane II, is shown as intersecting both the retrotransmissive article 710 and the vertical plane 740. For the sake of simplicity, the planes 740 and 750, along with the plane of article 710, can be considered to be mutually perpendicular to each other.

Figure 18:
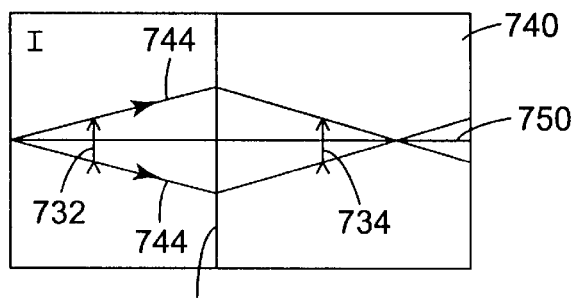
FIG. 18 is a view of the retrotransmissive article of FIG. 17 taken normal to Plane I.

Because the retrotransmissive article 710 exhibits unlimited retrotransmission, light transmitted through the retrotransmissive article 710 is retrotransmitted in both the vertical and horizontal planes 740 and 750. FIG. 18 is view of the system of FIG. 17 along horizontal plane 750 (depicted as line 750 in FIG. 18). As seen there, light 744 approaching from the left side of the retrotransmissive article 710 exits the right side of the article 710 at an equal, but opposite, angle relative to the horizontal plane 750 as the angle at which the light 744 enters the retrotransmissive article 710 (with some minor displacement that is not shown). The result is that an image 734 of the object 732 on the left side of the retrotransmissive article is retrotransmitted to the right side of the article 710 in Plane I (the vertical plane 740).

Figure 19:
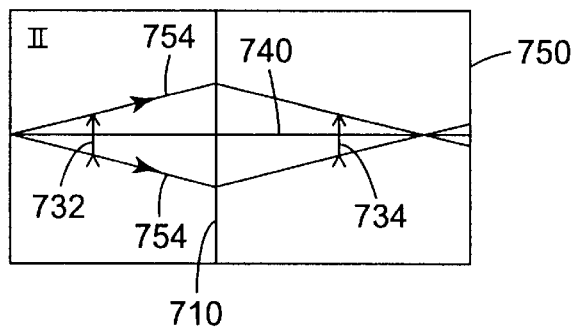
FIG. 19 is a view of the retrotransmissive article of FIG. 17 taken normal to Plane II.

FIG. 19 is a view of the system of FIG. 17 taken along vertical plane 740 (depicted as line 740 in FIG. 19). Light 754 approaching from the left side of the retrotransmissive article 710 exits the right side of the article 710 at an equal, but opposite, angle relative to the vertical plane 740 as the angle at which it enters the retrotransmissive article 710 (with some minor displacement that is not shown). The result is that an image of the object 732 on the left side of the retrotransmissive article is retrotransmitted to the right side of the article 710, resulting in a retrotransmitted image on the right side of the article 710.

The retrotransmission illustrated in FIGS. 17–19 is described as "unlimited retrotransmission" because an observer viewing the retrotransmissive article 710 along any plane intersecting the object 732 will observe the retrotransmitted image which is in contrast from the limited retrotransmission described in connection with the retrotransmissive article 610 above.

With the concepts of limited and unlimited retrotransmission now described, articles for accomplishing retrotransmissive imaging can be discussed as illustrated in FIGS. 20–24.

Limited Retrotransmissive Article

Figure 20:
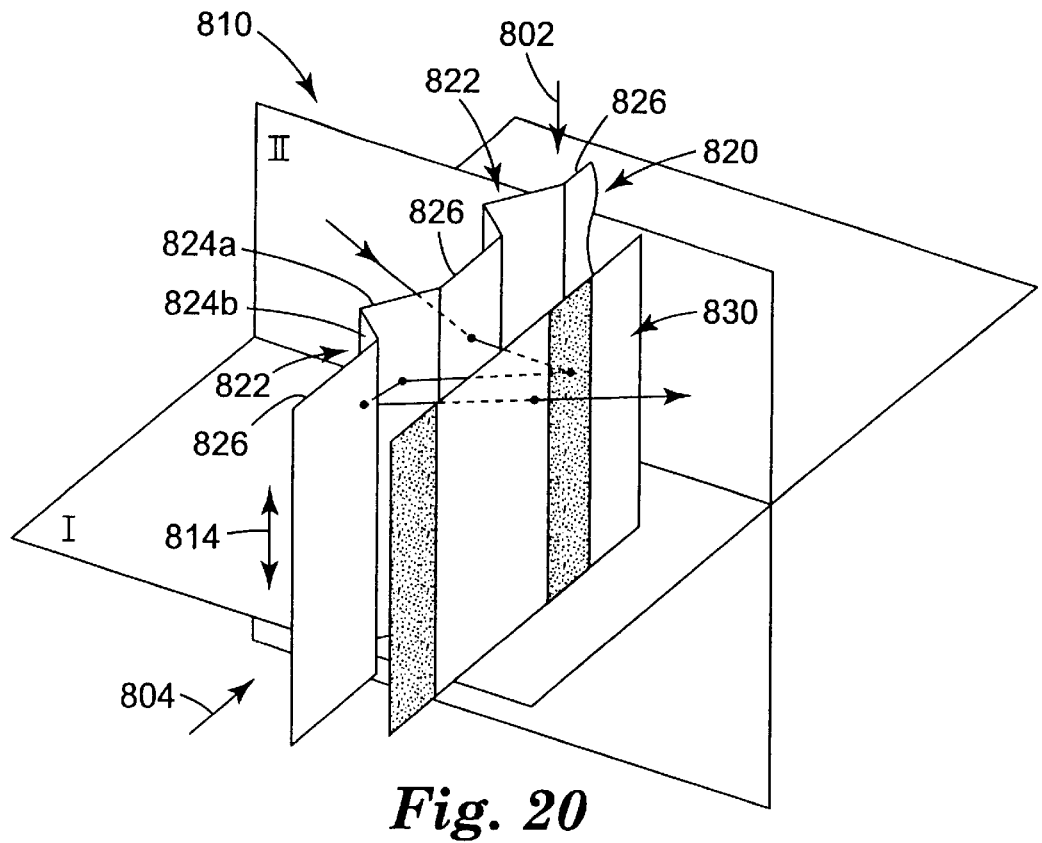
FIG. 20 is a perspective view of one retrotransmissive article capable of limited retrotransmission and reference Planes I and II.
Figure 21:
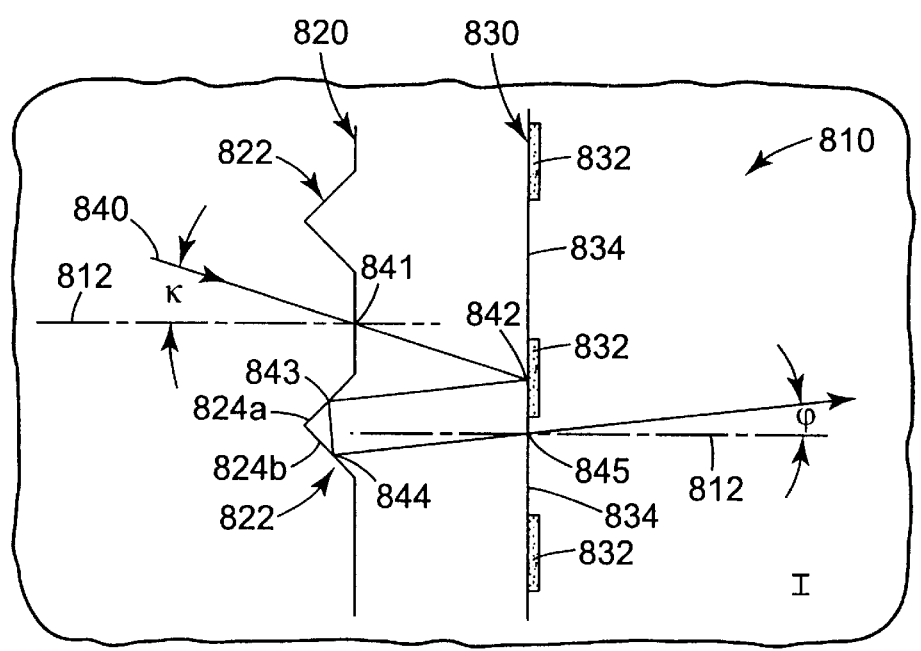
FIG. 21 is a view of the retrotransmissive article of FIG. 20 taken normal to Plane I.
Figure 22:
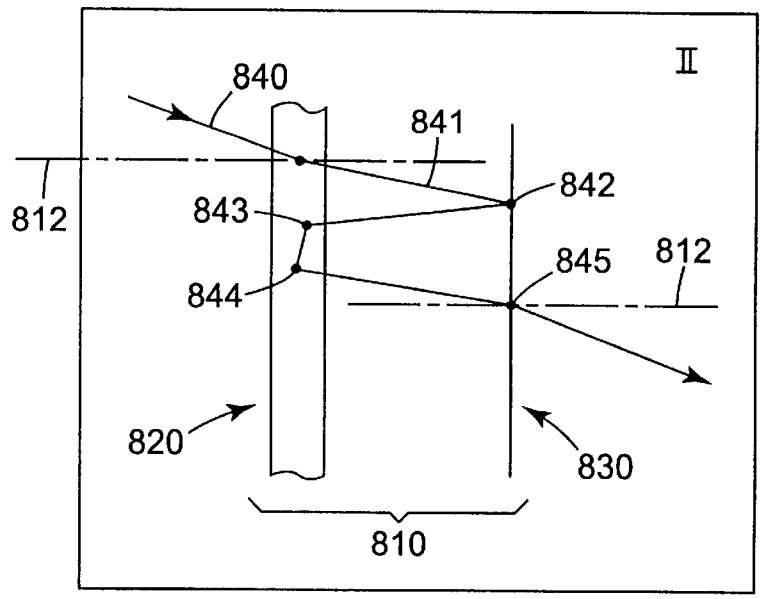
FIG. 22 is a view of the retrotransmissive article of FIG. 20 taken normal to Plane II.

FIGS. 20–22 illustrate one retrotransmissive imaging article capable of accomplishing limited retrotransmission as described above. FIG. 20 is a perspective view of the article 810, FIG. 21 is a view of the article 810 taken along the direction of arrow 802 in FIG. 20, and FIG. 22 is a view of article 810 taken along the direction of arrow 804 in FIG. 20.

The article 810 includes two opposing surfaces 820 and 830. The surface 820 preferably includes prisms 822 formed by planar facets 824*a* and 824*b* (referred to collectively as facets 824 below) that intersect at a right angle similar to the prisms described above in the retroreflective imaging articles. The prisms 822 are preferably aligned with an axis 814 (arrow 802 is preferably parallel to the axis 814).

Also illustrated are planar surfaces 826 located between pairs of prisms 822 on the surface 820. The planar surfaces 826 are similar to the planar mirror surfaces found in the retroreflective imaging articles except that the planar surfaces 826 preferably transmit at least a portion, preferably most, of the light striking them to allow for the entrance of light into or the exit of light from the retrotransmissive article 810 through the surface 820.

The opposing side 830 is preferably at least partially transmissive to light entering the retrotransmissive article 810 and, at the same time, is also at least partially reflective to light striking side 830 from the direction of side 820. This combination of qualities can be provided by a variety of different methods and materials. Examples include, but are not limited to, coating the entire side 830 to be partially reflective or coating portions of the side 830 to reflect substantially all light while leaving other portions substantially transmissive to light. In the illustrated retrotransmissive article 810, the side 830 includes reflective areas 832 and transmissive areas 834. Although the areas 832 and 834 are depicted as being uniformly and evenly distributed over the side 830, they may alternatively be provided in uneven distributions and/or in any desired regular or irregular pattern, with the understanding that some patterns may function better to retrotransmit light than others.

The facets 824 forming the prisms 822 preferably reflect substantially all of the light incident on them from the direction of side 830. In some retrotransmissive articles 810, the facets 824 may be provided with a reflective material, e.g., a coating, film, etc. to improve their reflectivity. The reflective properties of the facets 824 may also be provided by total internal reflection at the surface of the facets 824, or by a combination of total internal reflection and reflective materials.

FIG. 21 illustrates the path of light ray as seen along the direction of arrow 802 in FIG. 20, i.e., along the length of the prisms 822. The light 840 enters the retrotransmissive article 810 at point 841 on one of the planar surfaces 826 separating the prisms 822 on side 820. From point 841 the light is refracted to point 842 on one of the reflective areas 832 on side 830 where it is reflected toward point 843 on facet 824*a*. From facet 824*a*, the light is reflected to point 844 on the other facet 824*b*, where it is reflected to point 845 on one of the transmissive areas 834 on side 830. The light is then refracted through side 830 at point 845, thereby completing its passage through the retrotransmissive article 810. Although light 840 is retrotransmitted through the retrotransmissive article 810, some light approaching the retrotransmissive article 810 at the correct angles may be transmitted through both the planar surface 826 and one of the transmissive areas 834 on side 830 without reflection or retrotransmission.

The direction of the light as illustrated in FIG. 21 between points 842 and 843 is parallel to the direction of the light between points 844 and 845 as projected into Plane I. It is the parallel orientation of those two reflected paths within the article 810 that provides for the retrotransmission of light in Plane I and other planes that are also perpendicular to Plane II. The retrotransmission of light 840 is seen in FIG. 21 where light 840 approaches the planar surface 826 at an angle κ off of the normal axis 812. After exiting side 830 of the retrotransmissive article 810, the light is directed at angle φ off of the normal axis 812, where the exit angle is equal in magnitude, but opposite in sign from the entrance angle.

FIG. 22 is a view of the retrotransmissive article 810 taken along the direction of arrow 804 which is normal to Plane II depicted in FIG. 20. From that perspective, one of the facets 824 of the prisms 822 is visible on side 820 along with a portion of one of the planar surfaces 826. Ray of light 840 is also illustrated in FIG. 22 and it enters the retrotransmissive article 810 through point 841 on one of the planar surfaces 826, where is refracted to point 842 on one of the reflective areas 832 on side 830. From point 842, the light is reflected to one of the prisms 822 on side 820, where it is retroreflected back towards side 830, exiting the retrotransmissive 810 through a transmissive area 834 on side 830.

The effect of the retrotransmissive article 810 on the light 840 in Plane II is primarily transmission, i.e., the light is not retrotransmitted in Plane II as it is in Plane I. Because the retrotransmissive article 810 retrotransmits light only in planes perpendicular to Plane II, it is a limited retrotransmissive article.

Unlimited Retrotransmissive Articles

Figure 23:
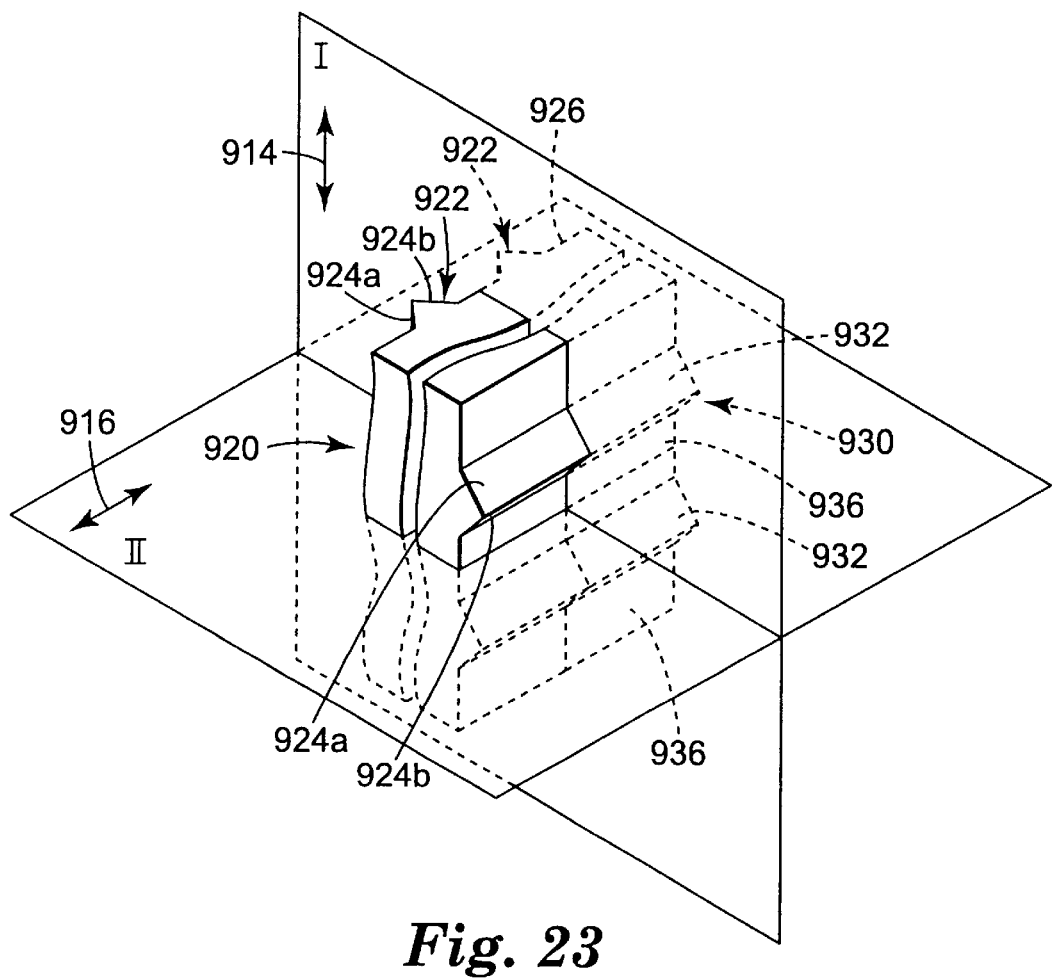
FIG. 23 is a perspective view of a retrotransmissive art article capable of unlimited retrotransmission and reference Planes I and II.

FIG. 23 depicts one embodiment of a retrotransmissive article 910 that is capable of unlimited retrotransmission, i.e., retrotransmission of incident light in two planes. The retrotransmissive article 910 includes two opposing sides 920 and 930.

The side 920 includes one or more, preferably a plurality, prisms 922 formed by perpendicular facets 924*a* and 924*b* (referred to collectively as facets 924 below). The prisms 922 are preferably aligned with a first axis 914 as seen in FIG. 23. At least some of the prisms 922 are spaced apart by planar surfaces 926. The planar surface 926 provide for the entrance and/or exit of light from the interior of the retrotransmissive article 910. As a result, it is preferred that the planar surfaces 926 transmit at least a portion, preferably most, of the light incident on them.

Similar to side 920, the opposing side 930 also includes one or more, preferably a plurality, of prisms 932 formed by perpendicular facets 934*a* and 934*b* (referred to collectively below as facets 934). The prisms 932 are preferably aligned with a second axis 916 as seen in FIG. 23. At least some of the prisms 932 on side 930 are also preferably spaced apart by planar surfaces 936. The planar surfaces 936 provide for the entrance and/or exit of light from the interior of the retrotransmissive article 910. As a result, it is preferred that the planar surfaces 936 transmit at least a portion, preferably most, of the light incident on them.

It is preferred, but not required, that the first and second axes 914 and 916 be oriented perpendicular to each other. As a result, it is preferred but not required that the prisms 922 on side 920 are also oriented perpendicular to the prisms 932 on side 930 (when the retrotransmissive article 910 is viewed along an axis that is normal to both sides 920 and 930).

Also depicted in FIG. 23 are a pair of planes with Plane I being oriented parallel to the prisms 922 on side 920, as well as the first axis 914. Plane II is oriented parallel to the prisms 932 on side 930 as well as axis 916. The prisms 932 retrotransmit light in Plane I (and other planes perpendicular to Plane II) and the prisms 922 retrotransmit light in Plane II (and the other planes perpendicular to Plane I). The retrotransmission in both Plane I and Plane II occurs as generally described above with respect to FIG. 21 in retrotransmissive article 810 above.

Another variation is that the article 910 may be converted into a retroreflective imaging article by modifying one of the sides 920 or 930 to reflect substantially all light incident thereon from the opposite side. One example of such an article is depicted in FIGS. 5 and 5A above.

Other Considerations

Although perfect retrotransmissive imaging articles may include prisms with perfectly planar facets oriented at perfect 90 degree angles or linear lenticular elements with perfectly formed lenses, as well as planar transmissive surfaces separating the prisms that are also perfectly planar and parallel where desired, those skilled in the art understand that some minor variations in the surfaces are possible. The result is that light may not be perfectly retrotransmitted, i.e., in perfectly equal, but opposite angles from normal axes. These variations can be caused by deviations in the orientation of the facet pairs, e.g., inconsistencies in the manufacturing of the facet pairs may cause them to vary slightly or variations purposely introduced into the design of the retrotransmissive articles that cause at least some of them to vary slightly. Typically, however, the retrotransmitted light will fall within a useful range. This "range" of retrotransmission may, in fact, be advantageous in some instances. As used in connection with the present invention, retrotransmission will include both perfect retrotransmission as well as imperfect retrotransmission, provided that a significant portion of the light that should be retrotransmitted is retrotransmitted.

Two retrotransmissive articles have been described above to illustrate the principles and features of retrotransmissive articles according to the present invention. It should, however, be understood that the invention is not to be limited to the illustrative embodiments described herein.

Figure 24:
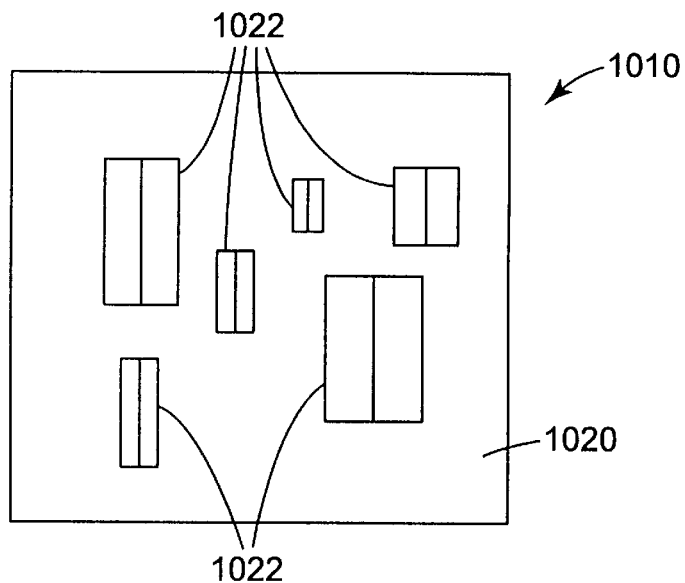
FIG. 24 is a plan view of one side of a retrotransmissive article.

For example, although the retrotransmissive articles 810 and 910 are depicted with uniformly sized and spaced prisms, the retrotransmissive articles could be provided with non-uniformly sized and/or non-uniformly spaced prisms as seen in FIG. 24. The prisms 1022 in the retrotransmissive article 1010 are provided in non-uniform sizes and are spaced about the side 1020 of the retrotransmissive article 1010 in an irregular pattern. The effect may be to enhance the performance of the retrotransmissive article 1010 in retrotransmitting light entering the retrotransmissive article 1010 at a wide range of angles with respect to an axis normal to the side 1020. The retrotransmissive articles according to the present invention may also be provided with uniformly sized prisms distributed with non-uniform spacing or non-uniformly sized prisms distributed with uniform spacing.

Figure 25:
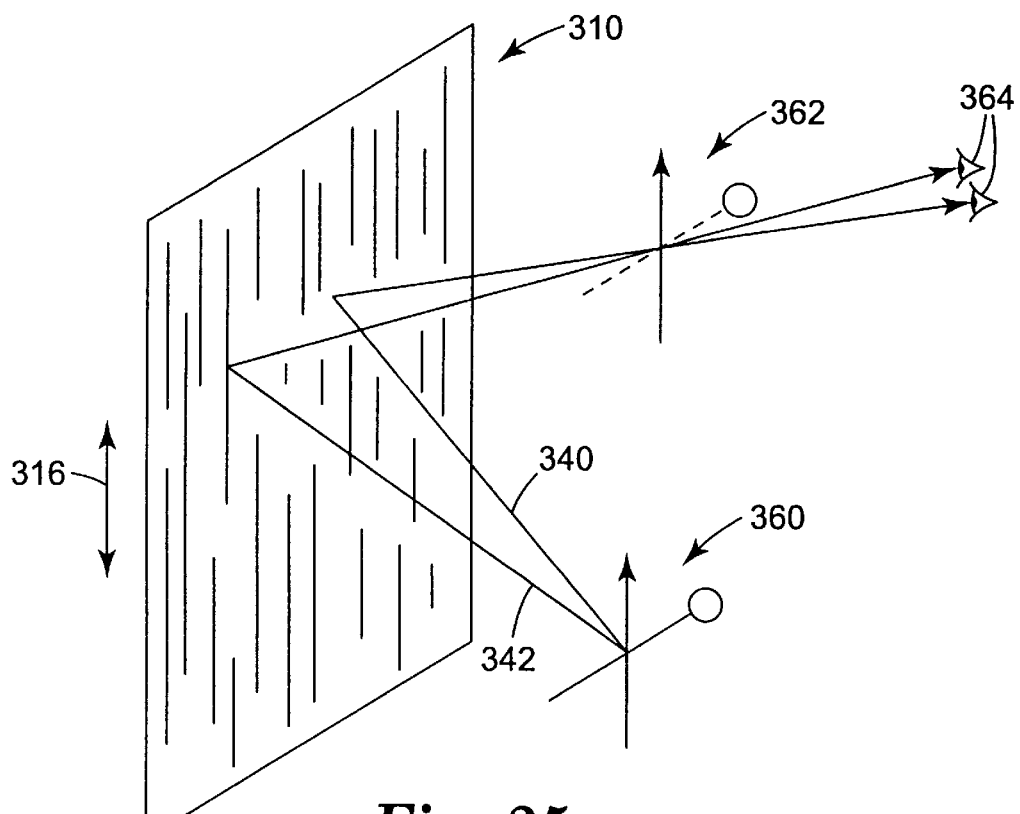
FIG. 25 is a perspective view of one system providing displaced imaging.

Another example is FIG. 25 which illustrates one system for accomplishing displaced imaging using a retroreflective article 310 that includes dual-axis retroreflective elements aligned along the axis 316 depicted in FIG. 25. Light rays 340 and 342 from the object 360 are reflected from the article 310 to form an image 362 in the eyes 364 of an observer. Because the system includes only a single set of dual-axis retroreflective elements, the system provides imaging only to observers with both eyes located in a plane that is perpendicular to the axis 316.

Figure 26:
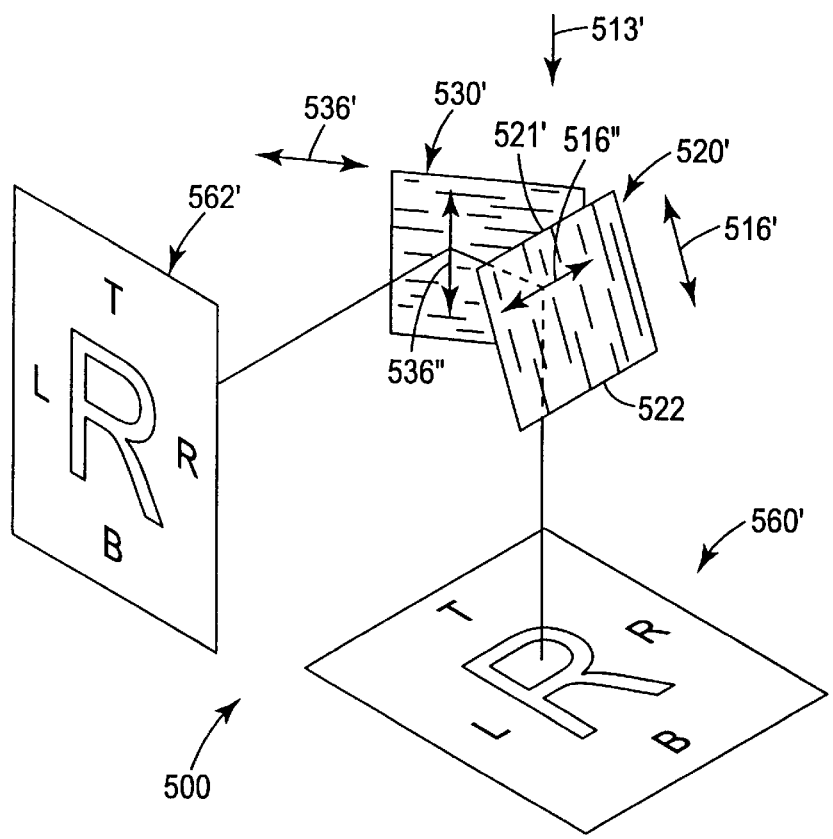
FIG. 26 is a perspective view of another system providing displaced imaging.
Figure 26A:
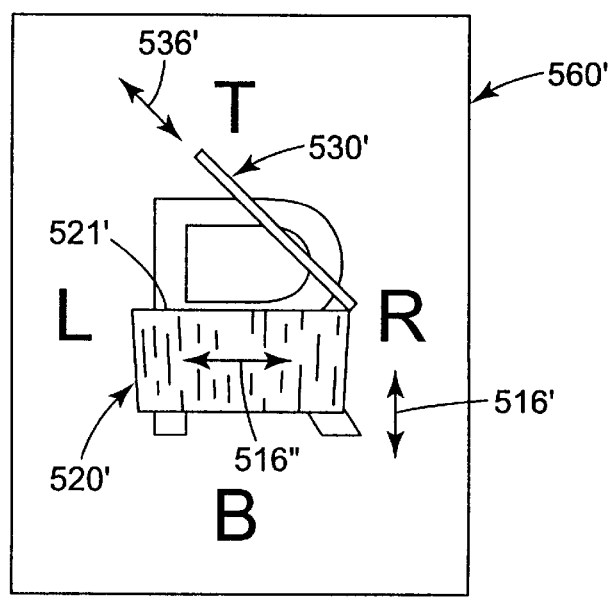
FIG. 26A is a view of the system of FIG. 26 taken along arrow 513' in FIG. 26.

FIGS. 26 and 26A illustrate another system for providing displaced imaging in a manner similar to an overhead projector using a retroreflective system 500 including dual axis retroreflective optical surfaces 520' and 530'. FIG. 26 is a perspective view of the system and FIG. 26A is a view of the system taken along arrow 513' in FIG. 26 to better illustrate the arrangement of the two opposing optical surfaces 520' and 530'. The optical surface 530' is preferably, but not necessarily, oriented generally perpendicular to the object 560' as indicated by the top view in which only the top edge of the optical surface 530' is seen. The optical surface 520' is oriented at an angle with respect to the object 560' and has a top edge 521' and bottom edge 522'. As a result, the plane defined by the first optical surface 520' intersects the plane defined by the second optical surface 530'.

The optical surface 520' includes a plurality of dual-axis retroreflective elements aligned with axis 516' and perpendicular to axis 516". The optical surface 530' includes a plurality of dual-axis retroreflective elements aligned with the axis 536' and perpendicular to axis 536".

For the system 500 to provide unlimited displaced retroreflective imaging, it is preferred that axis 516" lie in a plane that is parallel axis 536' and, further, that axis 536" lie in a plane that is parallel to axis 516'. In addition, optical surfaces 520' and 530' should be positioned such that imaging light can reflect from both surfaces to create an image.

It is preferred that the dual-axis retroreflective elements of the first and second surfaces 520' and 530' be located immediately adjacent each other, respectively. In other words, the first and second surfaces 520' and 530' preferably do not include planar surfaces between dual-axis retroreflective elements as seen in, e.g., FIGS. 2A–2C.

In operation, light from the object 560' strikes the optical surface 520' and is reflected by the dual-axis retroreflective elements on that surface towards the optical surface 530' where the dual-axis retroreflective elements on that surface reflect the light to form the image 562'. The addition of the second optical surface 530' from the system depicted in FIG. 25 provides for unlimited displaced imaging, i.e., viewers are not required to be located in any particular planar orientation relative to the optical surfaces 520' and 530' are able to view the image 562'. Furthermore, the entire image is viewable by a single observer by placing a diffuse reflector screen at the location of image 562'.

One advantage of the system depicted in FIGS. 26 and 26A is that a displaced image similar to the image produced by an overhead projector can be provided without the need for lenses and other more expensive optical components. Another advantage is that keystoning can be introduced into the image to correct for keystoning resulting from, e.g., a misaligned screen. Yet another advantage is that the system 500 produces an image that is free of color problems.

A variety of optical imaging articles have been described above to illustrate the principles and features of optical imaging using prisms according to the present invention. It should, however, be understood that the invention is not to be limited to the illustrative embodiments described herein.

Manufacturing Considerations

The optical imaging articles according to the present invention can be manufactured by replication using molds formed by many different methods, including those typically referred to as pin bundling and direct machining. Molds manufactured using pin bundling are made by assembling together individual pins, each of which have an end portion shaped with the desired features of the optical imaging article. Examples of pin bundling are described in, e.g., U.S. Pat. No. 3,926,402 to Heenan et al., and United Kingdom Patent Nos. 423,464 and 441,319 to Leray. The direct machining technique, sometimes referred to as ruling, involves cutting portions of a substrate to create a structured surface and can be used to manufacture the optical imaging articles themselves or molds for manufacturing the same. Examples of such ruling, shaping and milling techniques are described in U.S. Pat. No. 3,712,706 (Stamm); U.S. Pat. No. 4,349,598 (White); U.S. Pat. No. 4,588,258 (Hoopman); U.S. Pat. No. 4,895,428 (Nelson et al.); U.S. Pat. No. 4,938,563 (Nelson et al.).

Another manufacturing technique that may be used can be referred to as plate bundling in which plates are bundled together with the edge of the plate bundle forming the desired profile needed to form the prisms on the optical imaging articles of the present invention. In many respects, plate bundling is accomplished according to the same methods used in connection with pin bundling.

Although the optical imaging articles of the present invention described herein will generally be manufactured from molds, it will be understood that any other suitable methods could be used.

The optical imaging articles according to the present invention can be provided in macro- or micro-structured form (or a combination of both) and will typically exhibit the retroreflective or retrotransmissive properties discussed above in any combination of micro- and/or macro-structured form. Macro-structured articles can be provided from many different materials and in any appropriate dimensions depending on the intended application or use of the articles. Micro-structured articles will typically include small prisms, preferably about 16 prisms or more per centimeter when measured transverse to the linear peaks of the prisms (about 40 prisms or more per inch), although in some instances it may be preferable to provide about 28 prisms or more per centimeter (about 70 prisms per inch). It may further be advantageous to use thin micro-structured sheeting incorporating the structures described above in some situations.

Suitable materials for optical imaging articles according to the present invention can vary, although the articles will typically be manufactured from transparent materials that are dimensionally stable, durable, weatherable, and easily replicated in the desired configuration. Examples of suitable materials include glass, acrylics with an index of refraction of about 1.5 (e.g., PLEXIGLASS brand resin from Rohm & Haas Company), polycarbonates with an index of refraction of about 1.59, polyethylene based ionomers (e.g., SURLYN brand from E. I. DuPont de Nemours and Co., Inc.), polyesters, polyurethanes, and cellulose acetate butyrates. Other examples include reactive materials such as those taught in U.S. Pat. Nos. 4,576,850; 4,582,885; and 4,668,558.

Polycarbonates are particularly preferred for transparent articles because of their toughness, temperature stability, and relatively higher refractive index (about 1.59) which generally contributes to improved performance over a wider range of entrance angles when using second surface reflectors relying on total internal reflection with an air interface. The higher index of refraction provides a larger index of refraction difference to enhance total internal reflection at structure surface. In some instances where transmission of light through the optical imaging article such as for retrotransmissive articles, it may be desirable to use materials with lower indices of refraction to improve the range of light transmitted through the article. For example, where transmission is important, acrylics (with an index of refraction of about 1.5) may offer an advantageous combination of properties. The materials use to form optical imaging articles may also include UV stabilizers or other additives to improve their weatherability, durability, toughness or any other desired property.

Also, although transparent materials are preferred for the manufacture of optical imaging articles according to the present invention, it will be understood that first surface optical imaging articles of the present invention could be provided from opaque materials that may include a reflective coating as needed to enhance their reflective properties. Such coatings could include a metal or a dielectric stack. Also, even transparent materials could be partially or completely coated with materials to enhance their reflectivity and such combinations could be used in either first or second surface optical imaging articles according to the present invention.

It may also be advantageous to provide the optical imaging articles according to the present invention with one or more dyes, colorants, or pigments to enhance the conspicuity of the images produced using the articles. As used herein, the term "coloring agent" will be used to refer to any dye, colorant, pigment, etc. used to effect a visible color change in the optical imaging articles according to the present invention.

The patents, patent documents, and publications cited in this document are incorporated by reference in their entirety, as if each were individually incorporated by reference. Various modifications and alterations of this invention will become apparent to those skilled in the art without departing from the scope of this invention, and it should be understood that this invention is not to be unduly limited to the illustrative embodiments set forth herein.

What is claimed is:

1. An optical imaging article comprising:

a first side comprising a plurality of first dual-axis retroreflective elements located in a first plane, each of the first dual-axis retroreflective elements being generally aligned with a first axis, the first side further comprising a plurality of planar transmissive first surfaces oriented parallel to the first plane; and a second side comprising a plurality of second dual-axis retroreflective elements located in a second plane and aligned with a second axis, the second side further comprising a plurality of reflective planar second surfaces oriented parallel to the second plane, the second dual-axis retroreflective elements being spaced from the first side, wherein the first and second axes are generally perpendicular to each other.

2. The article of claim 1, wherein each of the planar transmissive first surfaces are located between two of the first dual-axis retroreflective elements.

3. The article of claim 1, wherein each of the planar transmissive second surfaces are located between two of the second dual-axis retroreflective elements.

4. The article of claim 1, wherein at least one of the first dual-axis retroreflective elements in the plurality of first dual-axis retroreflective elements comprises a linear peak and a pair of planar facets oriented perpendicular to each other.

5. The article of claim 1, wherein at least one of the second dual-axis retroreflective elements in the plurality of second dual-axis retroreflective elements comprises a linear peak and a pair of planar facets oriented perpendicular to each other.

6. A pavement marker comprising:
a first side comprising a plurality of first dual-axis retroreflective elements located in a first plane, each of the first dual-axis retroreflective elements being generally aligned with a first axis, the first side further comprising a plurality of planar reflective first surfaces oriented parallel to the first plane;
a second side located opposite the first side, the second side comprising a plurality of second dual-axis retroreflective elements located in a second plane and aligned with a second axis, wherein the second plane is parallel to the first plane and the first and second axes are generally perpendicular to each other; and
a first optical window located between the first and second sides, the optical window transmitting at least a portion of light incident thereon and refracting the light towards one of the first and second sides.

7. The article of claim 6, wherein each of the planar reflective first surfaces are located between two of the first dual-axis retroreflective elements.

8. The article of claim 6, wherein at least one of the first dual-axis retroreflective elements in the plurality the first dual-axis retroreflective elements comprises a linear peak and a pair of planar facets oriented perpendicular to each other.

9. The article of claim 6, wherein each of the second dual-axis retroreflective elements in the plurality the second dual-axis retroreflective elements comprises a linear peak and a pair of planar facets oriented perpendicular to each other.

10. An optical imaging article comprising:
a first side comprising a plurality of dual-axis retroreflective elements located in a first plane, each of the dual-axis retroreflective elements being generally aligned with a first axis, the first side further comprising at least one planar reflective first surface oriented parallel to the first plane; and
an opposing prism comprising a linear peak and a pair of surfaces oriented perpendicular to each other, the linear peak of the prism being spaced from the first side and generally aligned with a second axis, wherein the first and second axes are generally perpendicular to each other.

11. The article of claim 10, wherein a first surface in the pair of surfaces forming the opposing prism is planar and further wherein a second surface in the pair of surfaces comprises a planar facet.

12. The article of claim 10, wherein a first surface in the pair of surfaces forming the opposing prism is planar and further wherein a second surface in the pair of surfaces comprises a curved surface.

13. The article of claim 10, wherein the optical imaging article comprises a pavement marker.

14. An optical imaging article comprising:
a first side comprising a plurality of first dual-axis retroreflective elements located in a first plane, each of the first dual-axis retroreflective elements being generally aligned with a first axis, the first side further comprising a plurality of planar transmissive first surfaces oriented parallel to the first plane; and
a second side reflecting a portion of light incident thereon and transmitting a portion of light incident thereon.

15. The article of claim 14, wherein the second side comprises a plurality of reflective and transmissive areas, wherein the reflective areas are planar and are oriented parallel to the first plane and reflect substantially all light incident thereon, and further wherein the transmissive areas transmit at least a portion of the light incident thereon.

16. The article of claim 15, wherein the transmissive areas are planar and are oriented parallel to the first plane.

17. The article of claim 15, wherein the reflective and transmissive areas are aligned with the first axis.

18. An optical imaging article comprising:
a first side comprising a plurality of first dual-axis retroreflective elements located in a first plane, each of the first dual-axis retroreflective elements being generally aligned with a first axis, the first side further comprising a plurality of planar first surfaces oriented parallel to the first plane; and
a second side comprising a plurality of second dual-axis retroreflective elements located in a second plane and aligned with a second axis, the second side further comprising a plurality of planar second surfaces oriented parallel to the second plane, the second dual-axis retroreflective elements being spaced from the first side, wherein the first and second axes are generally perpendicular to each other.

19. The article of claim 18, wherein the plurality of planar first surfaces and the plurality of planar second surfaces transmit a portion of light incident thereon and further wherein the plurality of planar first surfaces and the plurality of planar second surfaces reflect a portion of light incident thereon.

20. The article of claim 18, wherein at least one of the first dual-axis retroreflective elements in the plurality the first dual-axis retroreflective elements comprises a linear peak and a pair of planar facets oriented perpendicular to each other.

21. The article of claim 18, wherein at least one of the second dual-axis retroreflective elements in the plurality of second dual-axis retroreflective elements comprises a linear peak and a pair of planar facets oriented perpendicular to each other.

22. An imaging device comprising:
a first optical surface comprising a plurality of first dual-axis retroreflective elements located in a first plane, the plurality of first dual-axis retroreflective elements being generally aligned with a first axis and generally perpendicular to a second axis; and
a second optical surface comprising a plurality of second dual-axis retroreflective elements located in a second plane, the plurality of second dual-axis retroreflective elements being generally aligned with a third axis and generally perpendicular to a fourth axis;
wherein the second axis lies in a plane that is generally parallel to third axis, and further wherein the fourth axis lies in a plane that is generally parallel to the first axis, and still further wherein the first plane intersects the second plane;
whereby a portion of light from an object that is directed in a first direction towards the first optical surface is reflected by the first dual-axis retroreflective elements towards the second optical surface where it is reflected by the second dual-axis retroreflective elements in a second direction to form an image of the object.

23. A method of retroreflective superimposed imaging comprising:
a) providing an optical imaging article comprising:

a first side comprising a plurality of first dual-axis retroreflective elements located in a first plane, each of the first dual-axis retroreflective elements being generally aligned with a first axis, the first side further comprising a plurality of planar transmissive first surfaces oriented parallel to the first plane; and a second side comprising a plurality of second dual-axis retroreflective elements located in a second plane and aligned with a second axis, the second side further comprising a plurality of reflective planar second surfaces oriented parallel to the second plane, the second dual-axis retroreflective elements being spaced from the first side, wherein the first and second axes are generally perpendicular to each other;

b) directing light at the optical imaging article from an object; and c) observing a retroreflected image of the object.

24. A method of retroreflective superimposed imaging comprising:

a) providing an optical imaging article comprising:

a first side comprising a plurality of dual-axis retroreflective elements located in a first plane, each of the dual-axis retroreflective elements being generally aligned with a first axis, the first side further comprising at least one planar reflective first surface oriented parallel to the first plane; and an opposing prism comprising a linear peak and a pair of surfaces oriented perpendicular to each other, the linear peak of the prism being spaced from the first side and generally aligned with a second axis, wherein the first and second axes are generally perpendicular to each other;

b) directing light at the optical imaging article from an object; and c) observing a retroreflected image of the object.

25. The method of claim 24, wherein the optical imaging article comprises a pavement marker.

* * * * *